US012005989B2

(12) United States Patent
Costa

(10) Patent No.: US 12,005,989 B2
(45) Date of Patent: Jun. 11, 2024

(54) AIR SUSPENSION SYSTEM

(71) Applicant: Vince Costa, Anaheim, CA (US)

(72) Inventor: Vince Costa, Anaheim, CA (US)

( * ) Notice: Subject to any disclaimer, the term of this patent is extended or adjusted under 35 U.S.C. 154(b) by 0 days.

(21) Appl. No.: 18/311,823

(22) Filed: May 3, 2023

(65) Prior Publication Data

US 2023/0271669 A1    Aug. 31, 2023

Related U.S. Application Data

(62) Division of application No. 17/234,622, filed on Apr. 19, 2021, now Pat. No. 11,718,363.

(60) Provisional application No. 63/082,870, filed on Sep. 24, 2020, provisional application No. 63/017,090, filed on Apr. 29, 2020.

(51) Int. Cl.
*B62K 25/04* (2006.01)
*B60G 17/027* (2006.01)

(52) U.S. Cl.
CPC ............ *B62K 25/04* (2013.01); *B60G 17/027* (2013.01); *B62K 2025/044* (2013.01); *B62K 2025/048* (2013.01); *B62K 2201/08* (2013.01)

(58) Field of Classification Search
CPC .............. B62K 25/04; B62K 2025/044; B62K 2025/048; B60G 17/027; B60G 11/27; F16F 9/0245; F16F 9/0254; F16F 9/32; F16F 9/34; F16F 9/43
See application file for complete search history.

(56) References Cited

U.S. PATENT DOCUMENTS

| 3,917,307 | A | * | 11/1975 | Shoebridge | B60G 21/06 280/6.159 |
|---|---|---|---|---|---|
| 4,390,188 | A | * | 6/1983 | Rouse | B60G 17/056 91/448 |
| 4,936,424 | A | * | 6/1990 | Costa | F16F 9/064 267/64.22 |
| 5,313,995 | A | * | 5/1994 | Schultz | B60C 23/00363 152/416 |
| 7,104,547 | B2 | * | 9/2006 | Brookes | B60G 17/0155 280/6.154 |
| 7,559,396 | B2 | | 7/2009 | Schwindt | |
| 7,607,667 | B2 | * | 10/2009 | Brookes | B60G 17/017 280/6.154 |
| 7,677,347 | B2 | | 3/2010 | Brawn | |
| 7,762,370 | B2 | | 7/2010 | Nieman | |
| 7,857,336 | B1 | | 12/2010 | Yaple | |
| 8,113,322 | B2 | | 2/2012 | Arnott | |

(Continued)

*Primary Examiner* — Amy R Weisberg
*Assistant Examiner* — Tiffany L Webb
(74) *Attorney, Agent, or Firm* — Clement Cheng

(57) ABSTRACT

The integrated tank and compressor mounting system for a motorcycle has a mount block which has a mounting face, and a compressor clamp. The mount block has a threaded cylindrical section which forms a tank mount for mounting a tank. The tank has a cylindrical tubular section closed at one end and threaded at the other end such that the tank threads correspond to the mount block threads. The tank provides air for an air suspension which includes a forward suspension unit activated by air and an aft suspension unit activated by air. A supply line connects the tank air volume to an inlet valve on the suspension control unit. The suspension control unit has a cylindrical forward control valve passage and the forward control valve passage has a forward transfer chamber.

14 Claims, 20 Drawing Sheets

(56) References Cited

U.S. PATENT DOCUMENTS

| | | | |
|---|---|---|---|
| 8,155,835 B2 * | 4/2012 | Holbrook | B60G 17/0521 |
| | | | 280/6.151 |
| 10,202,166 B2 | 2/2019 | Fox | |
| 10,865,813 B2 * | 12/2020 | Frank | F15B 21/048 |
| 11,135,888 B2 * | 10/2021 | Reuter, II | F04B 41/00 |
| 2021/0206224 A1 * | 7/2021 | Repela | B60G 17/0525 |

* cited by examiner

AIR SUSPENSION SYSTEM

The present invention claims priority from United States non-provisional parent application entitled Air Suspension System by same inventor Vince Costa Ser. No. 17/234,622, filed Apr. 19, 2021 currently under examiner Tiffany Webb at art unit 3616, the disclosure of which is incorporated herein by reference. The patent application claims priority from provisional application Ser. No. 63/017,090 by same inventor Vince Costa, entitled Air Suspension System filed Apr. 29, 2020, the disclosure of which is incorporated herein by reference.

FIELD OF THE INVENTION

The present invention is in the field of vehicle air suspension systems.

DISCUSSION OF RELATED ART

For example, in U.S. Pat. No. 7,559,396 entitled Motorcycle Air Suspension System by inventor Jeffrey R. Schwindt, published Jul. 14, 2009 the abstract discloses, "A suspension system for use with a motorcycle includes a device for producing a supply of pressurized air. The suspension system is operably disposed between a frame member and a swing arm of the motorcycle. The suspension system comprises a double-acting pneumatic cylinder."

For example, in U.S. Pat. No. 7,677,347 entitled Adjustable Shock by inventor J. D. Brawn, published Mar. 16, 2010 the abstract discloses, "A motorcycle shock system has a shock body formed at least partially of aluminum and an air compressor that provides pressurized air to the shock body when necessary. A piston held within the shock body defines a rear air chamber and a forward air chamber on the opposite side of the piston. Four electrically controlled air valves include a first air valve that when actuated opens a passage to allow air to flow into the forward chamber, a second air valve that when actuated opens a passage to allow air to flow out of the forward chamber to the atmosphere, a third air valve that when actuated opens a passage to allow air to flow out of the rear air chamber, and a fourth air valve that when actuated opens a passage to allow air to flow into the rear air chamber."

For example, in United States patent number U.S. Pat. No. 7,762,370B2 entitled Assembly For A Motorized Vehicle by inventor Jason A. Nieman, published Jul. 27, 2010 the abstract discloses, "An assembly for a motorized vehicle is disclosed which includes a frame, a power source mounted to the frame, and a transmission connected to the power source. The assembly also includes a swing arm attached to the frame at a pivot point located between the power source and the transmission. The swing arm enables a rear wheel of the vehicle to move vertically relative to the frame. The assembly can also include a suspension system for cushioning the ride of the motorized vehicle and a safety mechanism which has to be manually activated before the vehicle can vertically move from a first, riding position to a second, parked position."

For example, in U.S. Pat. No. 7,857,336 entitled Air Suspension System by inventor Winfred E. Yaple, published Dec. 28, 2010 the abstract discloses, "An air suspension device includes a housing enclosing a compressor chamber that communicates with an air source and at least one piston chamber, optionally through internal air ports. A compressor is disposed in the compressor chamber. When the compressor is driven by a power source, such as a motor, the compressor draws air from the air source and drives the air into the piston chamber. A piston disposed in the piston chamber is cushioned by the pressurized air."

For example, in United States patent number U.S. Pat. No. 8,113,322B2 entitled Motorcycle Air Suspension System And Method by inventor Adam Arnott, published Feb. 14, 2012 the abstract discloses, "Air suspension systems, devices, apparatus, and methods for allowing motorcycle drivers to increase and decrease compressed air supplies in air suspension devices. Deflating interior air springs/airbags (bladders) inside the devices allows for springs and pistons on shock absorbers in the devices to expand outward separating lower front and rear frame portions which effectively lowers the motorcycle to the ground surface and for the driver to have a firmer ride. Inflating the air springs/airbags (bladders) allows for the springs and the pistons on the shock absorbers in the devices to retract into the devices so that the devices have a more shock absorbing effect giving the rider a smoother ride, which also raises the motorcycles above the ground surface."

For example, in United States patent number U.S. Ser. No. 10/202,166B2 entitled Integrated And Self-Contained Suspension Assembly Having An On-The-Fly Adjustable Air Spring by inventor Robert C. Fox, published Feb. 12, 2019 the abstract discloses, "An integrated and self-contained suspension assembly having a gas spring integrated with a shock absorber (damper) is described. The rigid gas cylinder of the air spring is divided into a first gas chamber and a second gas chamber. A flow port connects the first and second gas chambers, and can be manually opened or closed by valve and a simple one-quarter turn rotation of an external knob to instantly switch the gas spring between two different spring rates. The different spring rates are functions of the separate or combined volumes of the two. gas chambers. The integrated suspension assembly is compactly packaged and self-contained, i.e., does not require any externalities, such as gas sources or electricity, to operate."

SUMMARY OF THE INVENTION

One of the key aspects of the present invention air suspension system is the part integration. This integration of parts results in a lower cost system and also uses total part count to provide a system that is easier to inventory. Reduced inventory also contributes to a reduction in cost. While cars and trucks usually have plenty of space to mount accessory parts, motorcycles are very limited in space to mount accessories. This means the tank and air compressor are almost always mounted separately. The simplified system is also much easier to install on an existing vehicle. Further each part can be designed to be manufactured in a minimum of machining operations. This reduces the time and labor during fabrication. In addition to reducing cost, the performance of the system is improved.

An integrated tank and compressor mounting system for a motorcycle has a mount block. The mount block has a mounting face. The mount block has a compressor clamp. The mount block has a threaded cylindrical section which forms a tank mount. A tank includes a cylindrical tubular section closed at one end and threaded section at an opposite end such that the tank threads engage the mount block threads to form a threaded joint. The tank is attached to the mount block at the a threaded joint. The mounting face engages the motorcycles existing mount. The mounting face has one or more receptacles to engage a mounting block fastener. The mounting block fastener holds the mounting face to the motorcycles existing mount. The mounting face is positioned at an angle relative to the tank mount so that the tank will clear the existing frame mounting rail. The compressor clamp comprises a cylindrical opening to fit the compressor.

The integrated tank and compressor mount of claim has a pressure switch connected to the tank air volume. The pressure switch is electrically connected to a power supply on one end and the compressor on the other end. Attached to the mount block opposite the tank mount is a pressure switch. The pressure switch is connected to the tank air volume. The pressure switch is electrically connected to a power supply on one end and the compressor on the other end. A receptacle for air transfer from the compressor to the tank air volume is attached to the mount block opposite the tank mount. The mount block has one or more clamp bolts which act to clamp the compressor in place in the provided cylindrical opening.

The present invention also preferably includes a pressure switch connected to the tank air. The pressure switch is electrically connected to a power supply on one end and the compressor on the other end. A supply line connects the tank air volume to a suspension control unit. The suspension control system has one or more suspension units activated by air, and one or more cylindrical control valve passages. Each control valve passage has a transfer chamber. The transfer chamber is larger diameter than the control valve passage. The transfer chamber has an entrance port and an exit port. Each control valve passage has a component chamber. Each component chamber has a component port. Each component port is connected to its respective suspension unit. Each of the control valve passages has a control valve that is slidably inserted.

The control valves include a cylindrical shaft with one or more sealing surfaces along its axial length. One of those sealing surfaces is the main seal. The main seal is formed along the axial length of the control valve such that when a control valve is pushed towards the component port the main seal prevents air from passing between the transfer chamber and the component chamber, and the control valve is in the closed position. When the control valve is pulled away from the component port the main seal moves into the transfer chamber allowing air to bypass the main seal and pass between the component chamber and the transfer chamber allowing air to flow from the component port to both the entrance port and exit port then the control valve is in the open position. The one or more control valve passages are arranged in the suspension control unit so that each entrance port and exit port may be formed as one main passage thru the entire suspension control unit. The main passage is connected to both an inlet valve and an exhaust valve.

When the inlet valve is opened, air can flow from the supply pressure to the main passage and to any transfer chamber of each control valve. The main passage is connected to an exhaust valve on the other end. When the exhaust valve is opened air can flow from any transfer chamber through to the exhaust outlet. Any one or combination thereof of the suspension units may be linked in unison or independently to the supply pressure via the inlet valve or exhaust valve via the opening and closing of control valves. Since the transfer chambers are connected to the main passage so when the control valve is open the suspension units can either receive air from the supply pressure or release air thru the exhaust valve depending on which valves are used.

BRIEF DISCUSSION OF THE DRAWINGS

Figure 1:
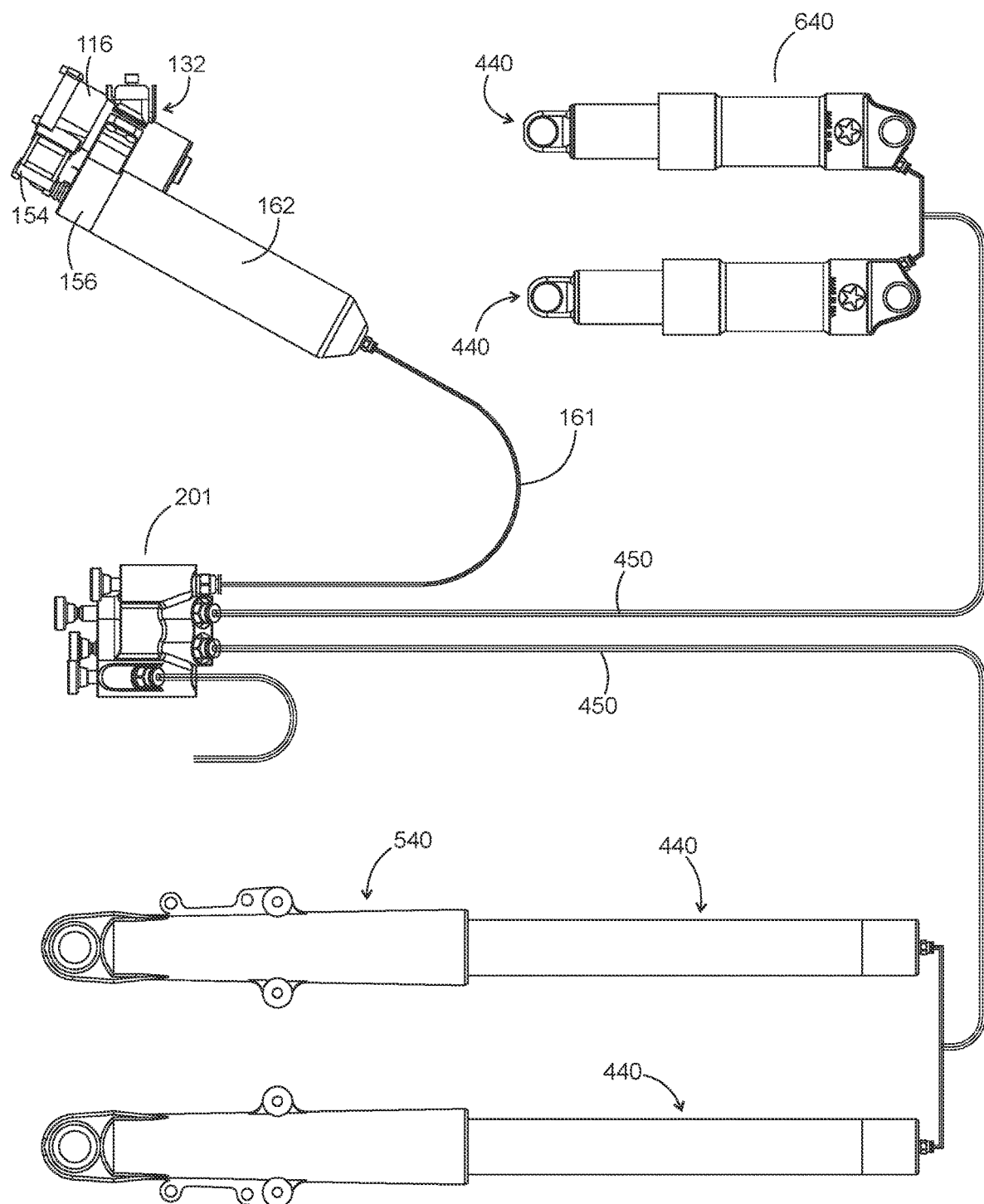
FIG. 1 is an overview of the air suspension components to be installed and used on a vehicle.

The following call out list of elements can be a useful guide in referencing the element members of the drawings.

106 air transfer receptacle
108 check valve
110 clamp bolts
112 clearance between tank and mount
114 closed end of the tank
116 compressor
120 compressor clamp
121 clamp pinch
122 compressor opening
126 existing mount
130 existing frame rails
132 integrated air tank and compressor mounting system
134 motorcycle
138 mount block
140 mount block fastener
142 mount block threaded cylindrical section
144 mount block threads
146 mounting face 148 mounting face angle
150 mounting receptacles
152 open end of the tank
154 power supply
156 pressure switch
158 receptacle for compressor air transfer
160 receptacle for the pressure switch
161 supply line
162 tank
164 tank air volume
166 tank assembly
170 tank mount
171 Tank mount wall
174 tank threads
176 tank to suspension control unit line
178 threaded cylindrical section
180 threaded fastener
182 mounting bolt
190 power wire
192 hot wire
201 suspension control unit
210 closed position
212 component chamber
214 component port
215 component seal
216 control valve
218 control valve passages
230 control valve shaft
231 control valve knob
236 entrance port
243 exhaust outlet
248 exhaust valve
254 exit port
260 inlet valve
262 main passage
264 main seal
276 supply pressure
288 transfer chamber
289 transfer seal
440 suspension unit
450 air suspension line
510 front closed position
512 front component chamber
514 front component port
516 front control valve
518 front control valve passage
530 front control valve shaft
536 front entrance port
540 front air forks
561 Front air suspension line
564 front main seal
588 front transfer chamber
610 rear closed position
612 rear component chamber
614 rear component port
616 rear control valve
618 rear control valve passage
630 rear control valve shaft
636 rear entrance port
640 Rear Air Suspension
661 Rear air suspension line
664 rear main seal
688 rear transfer chamber

DETAILED DESCRIPTION OF THE PREFERRED EMBODIMENT

This air suspension system has several main parts that work harmoniously to provide an excellent ride under any load condition. As shown in FIG. 1, the primary parts of this air suspension system include: an air compressor 116 to provide compressed air; a tank 162 for holding the compressed air; a pressure switch 156 for determining when the power supply 154 should activate the compressor 116; an integrated tank and compressor mounting system 132 to combine the compressor 116, tank 162, and pressure switch 156 together and to the vehicle; a suspension control unit 201 to activate the one or more air suspension units 440; an air supply line 161 connecting the tank 162 to the suspension control unit 201; and the suspension control unit 201 connecting to the air suspension units 440 with an air suspension line 450.

Typically, the one or more air suspension units 440 include a pair of rear air suspension 640 and a pair of front air forks 540. However, it is possible to use this system in other configurations. Although the system is intended for motorcycles, the described suspension control unit 201, could be expanded to a three or four wheeled vehicle with independent control of three or four suspension units. The suspension control unit 201 could be expanded for a vehicle with six suspension units or more.

The manner in which each of these items are constructed is unique and creates significant advantages in cost of manufacture and operational performance. The compressor 116, the pressure switch 156, and the tank 162 are combined into the integrated tank and compressor mounting system 132 by forming them integrally.

Figure 2:
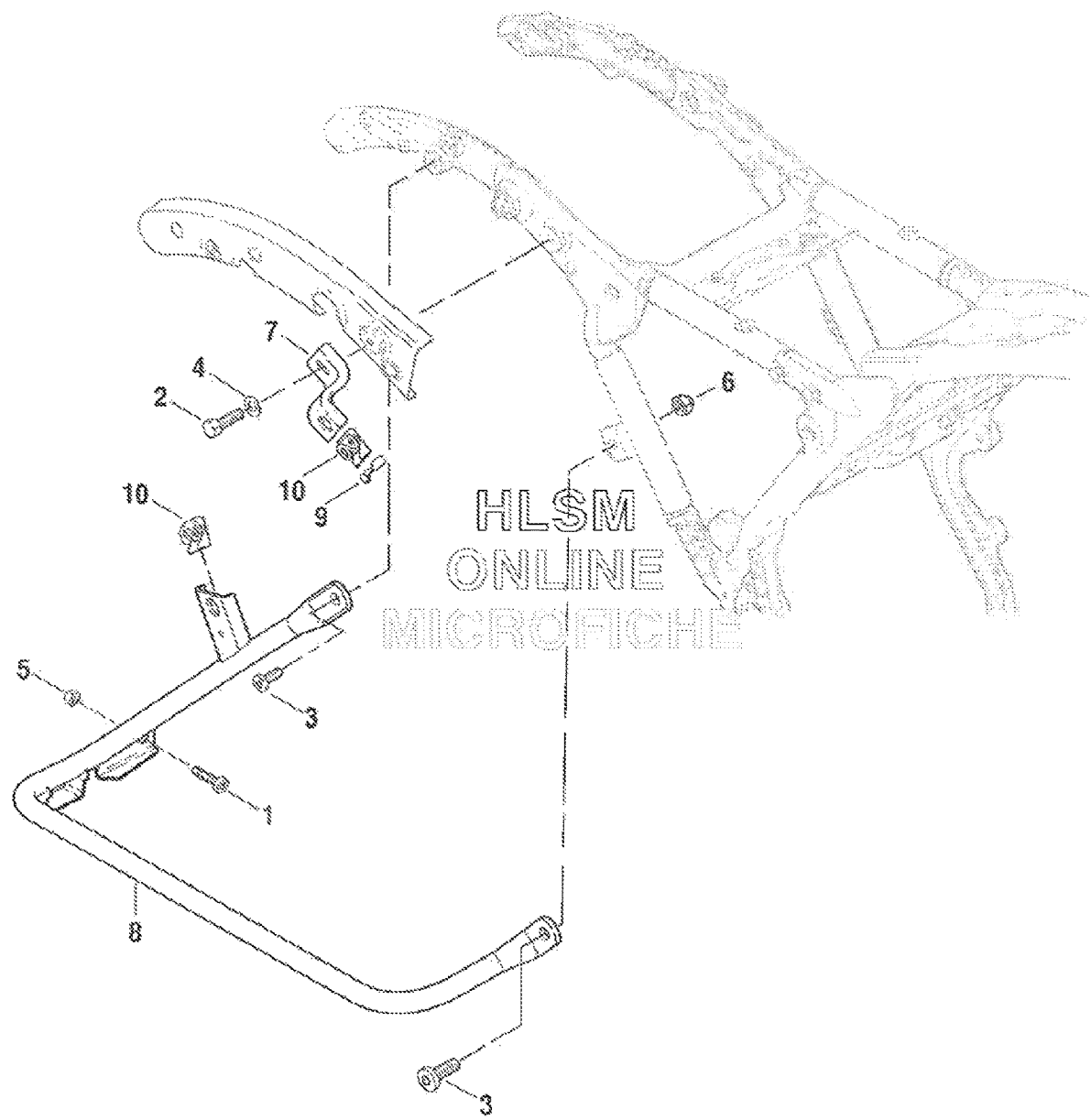
FIG. 2 is an illustration of a typical prior art motorcycle frame layout, taken from the Harley-Davidson online parts manual.

The integrated tank and compressor mounting system 132 can mount to a motorcycle existing mount 126 with motorcycles existing frame rails 130 such as the prior art motorcycle frame shown in FIG. 2. The following discussion of the detailed embodiment first explains the configuration of the major components and how they fit to the vehicle and work together.

As shown in FIGS. 3-10, a key part of this air suspension system is the integrated tank and compressor mounting system. The integrated tank and compressor mounting system is optimized to fit popular motorcycles as an aftermarket accessory. The integrated tank and compressor mounting system includes two main parts, a mount block 138, and a tank 162. The mount block 138 is preferably formed from a single piece of metal and manufactured by computer numerical control machining equipment.

The one-piece mount block 138 has several surfaces. The mount block has a mounting face 146, a compressor clamp 120, and a threaded cylindrical section 178 which forms a tank mount 170. Mount block threads 144 are formed on the threaded cylindrical section 178 of the mounting block 138. The mount block provides a integrated frame for connecting and mounting the other components.

Figure 6:
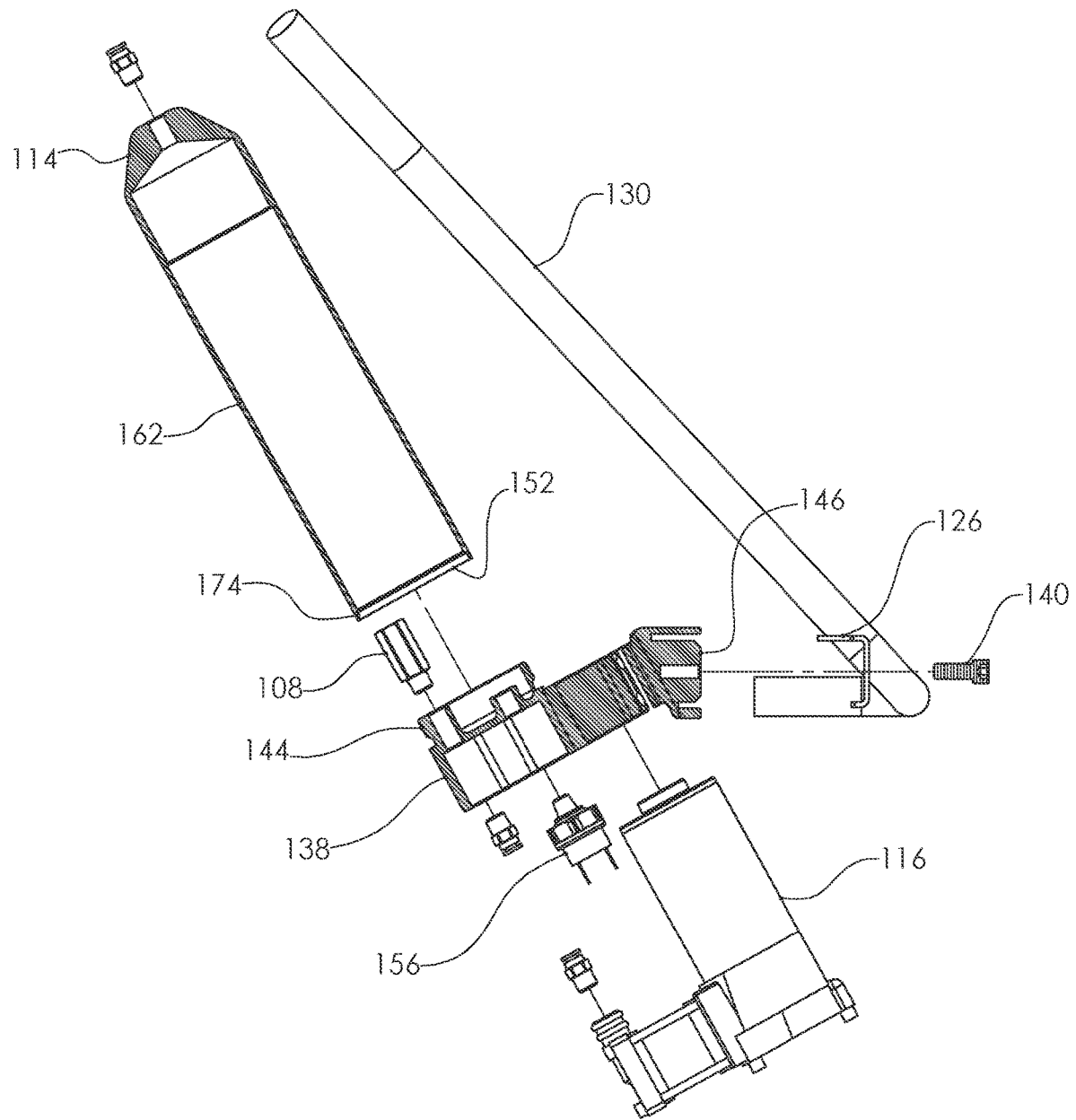
FIG. 6 is an exploded partial section view of integrated air tank and compressor mounting system.

As shown in FIG. 6, tank 162 has a cylindrical tubular section closed at one end, which is the closed end of the tank 114, and threaded at the other end which is the open end of the tank 152. The tank is configured to hold pressurized air and the pressurized air within the tank operates the air suspension units 440. The tank threads 174 correspond and are configured to engage to the mount block threads 144 to form a joint. The tank 162 is attached to the mount block 138 at this joint.

Figure 5:
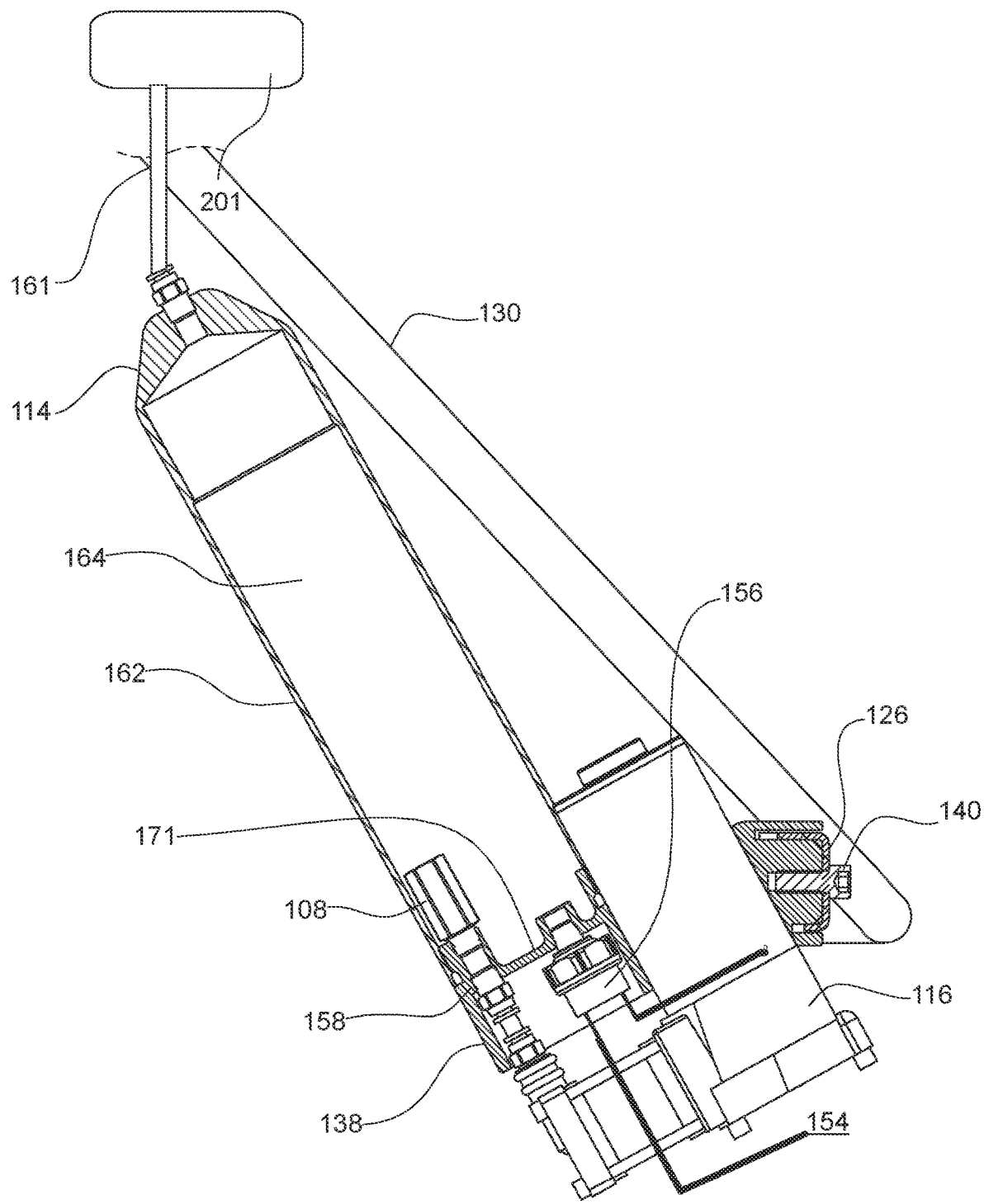
FIG. 5 is a section view of integrated air tank and compressor mounting system.

As shown in FIG. 5, when the tank 162 is attached to the mount block 138, a tank air volume 164 is created inside the tank 162 and between the tank mount wall 171. The tank mount wall 171 closes off the tank mount 170 and forms the tank air volume 164 which is enclosed. Preferably, an O-ring or similar seal is used at the tank 162 to seal to the mount block 138.

Figure 7:
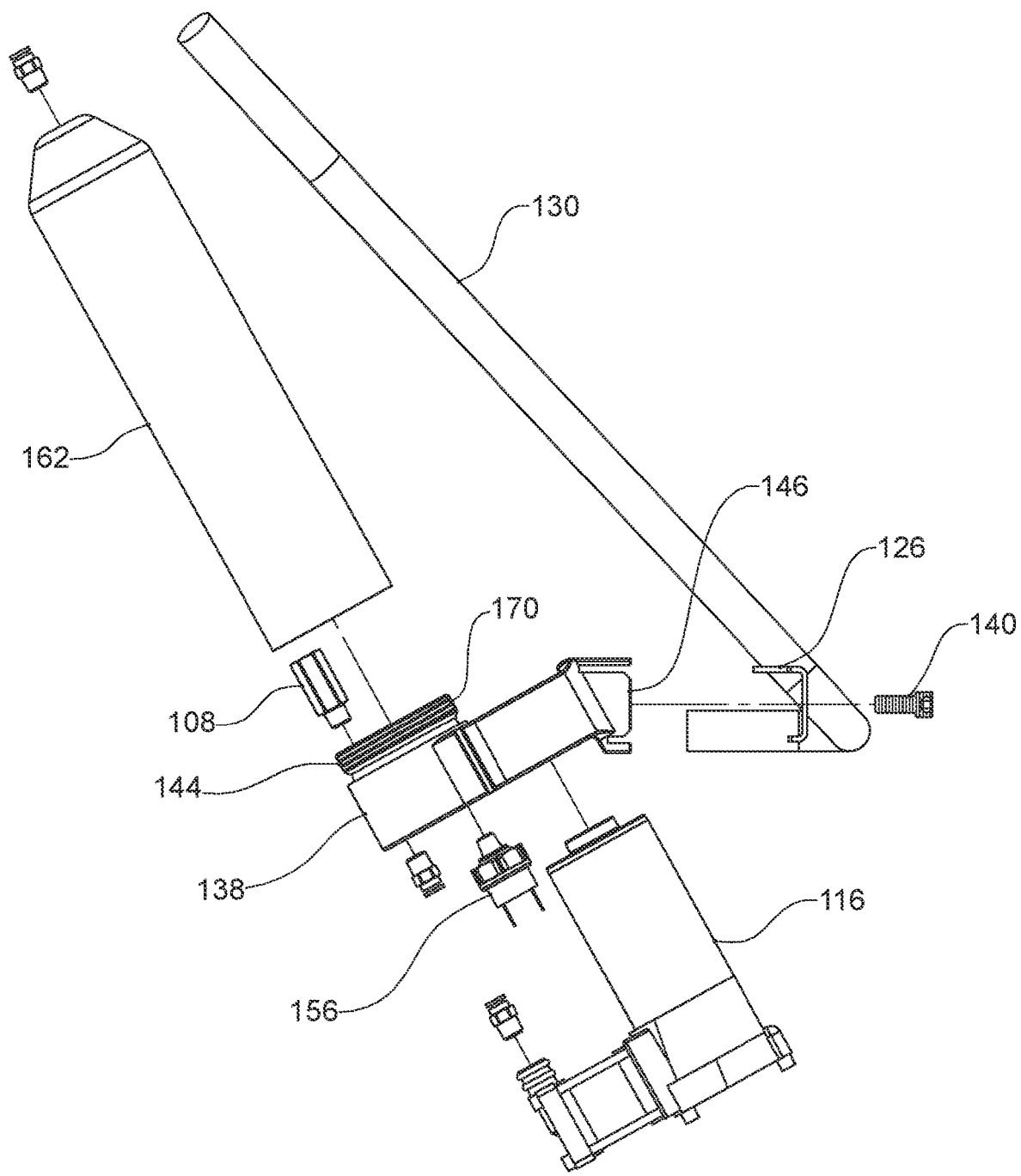
FIG. 7 is an exploded view of integrated air tank and compressor mounting system.
Figure 8:
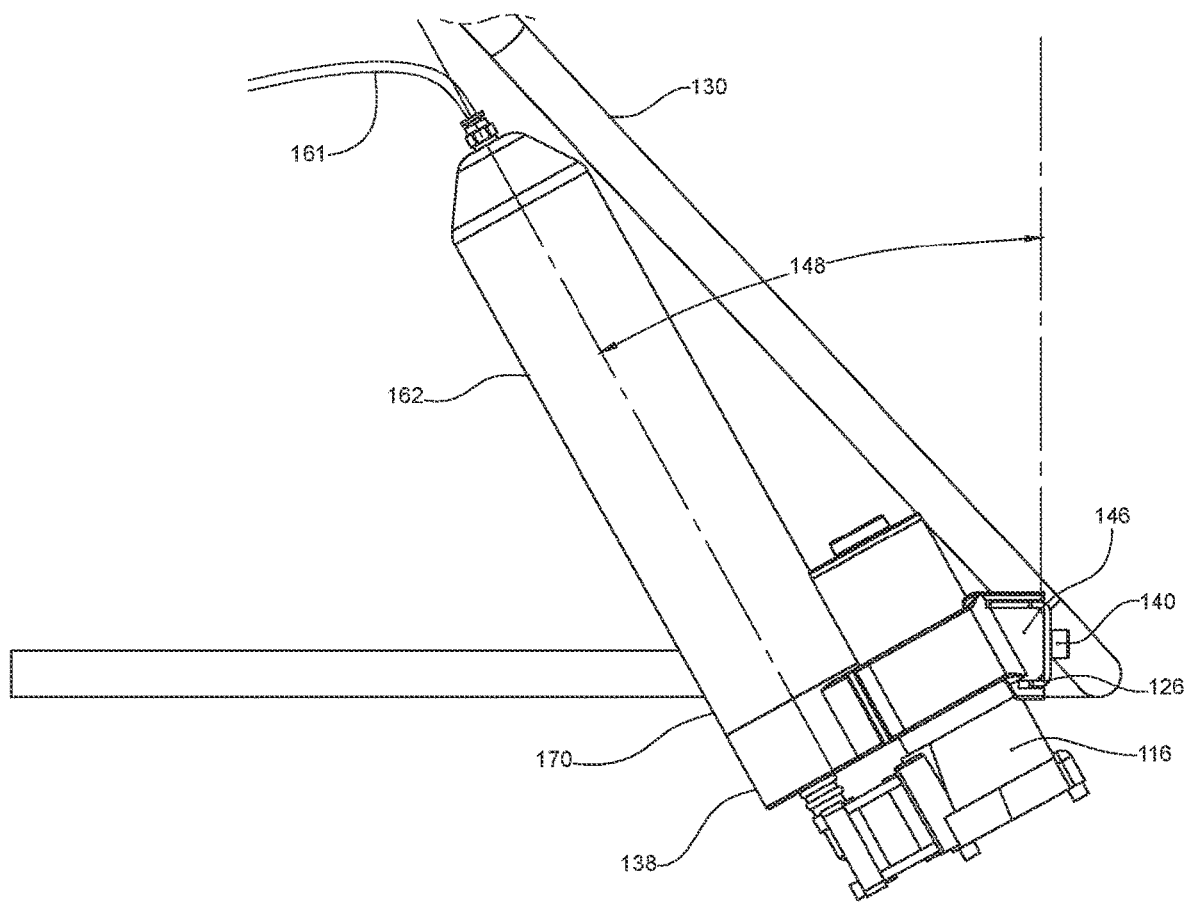
FIG. 8 is a mounted view of integrated air tank and compressor mounting system showing angle.
Figure 9:
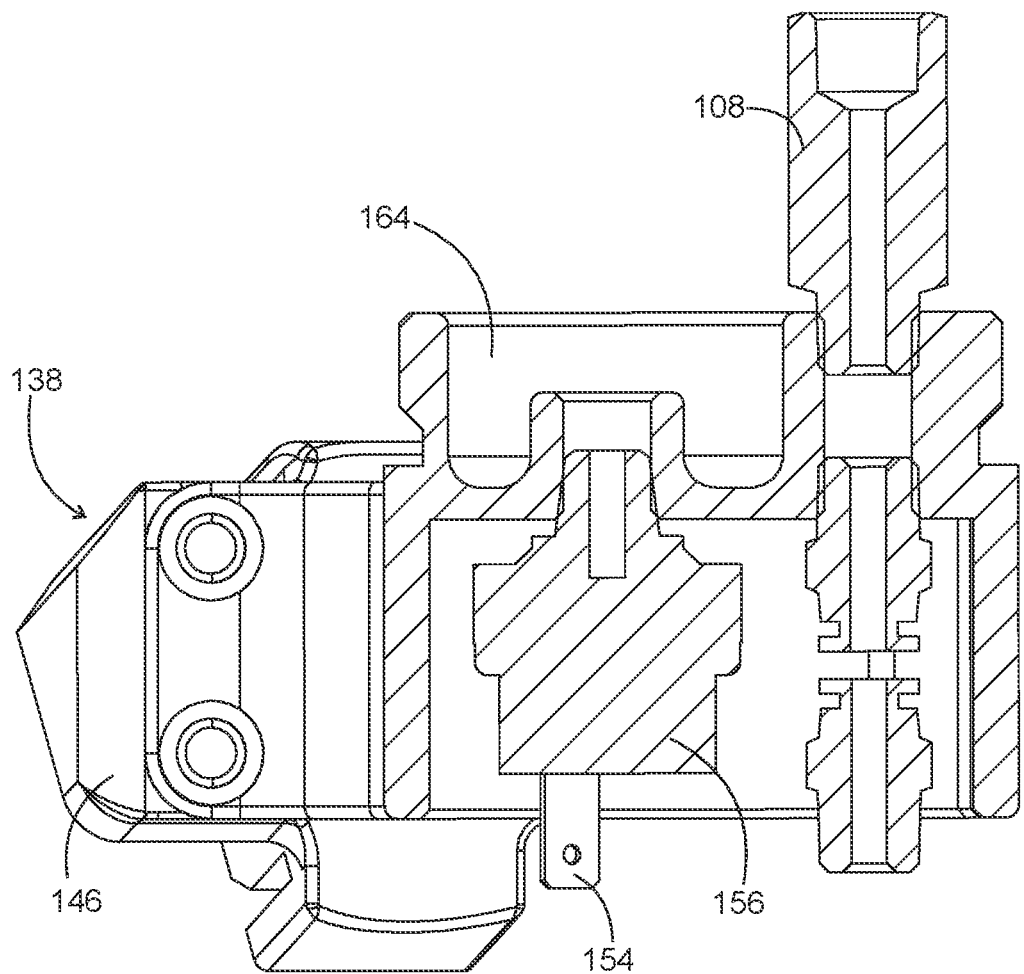
FIG. 9 is a cross section detail of the pressure switch mount.
Figure 10:
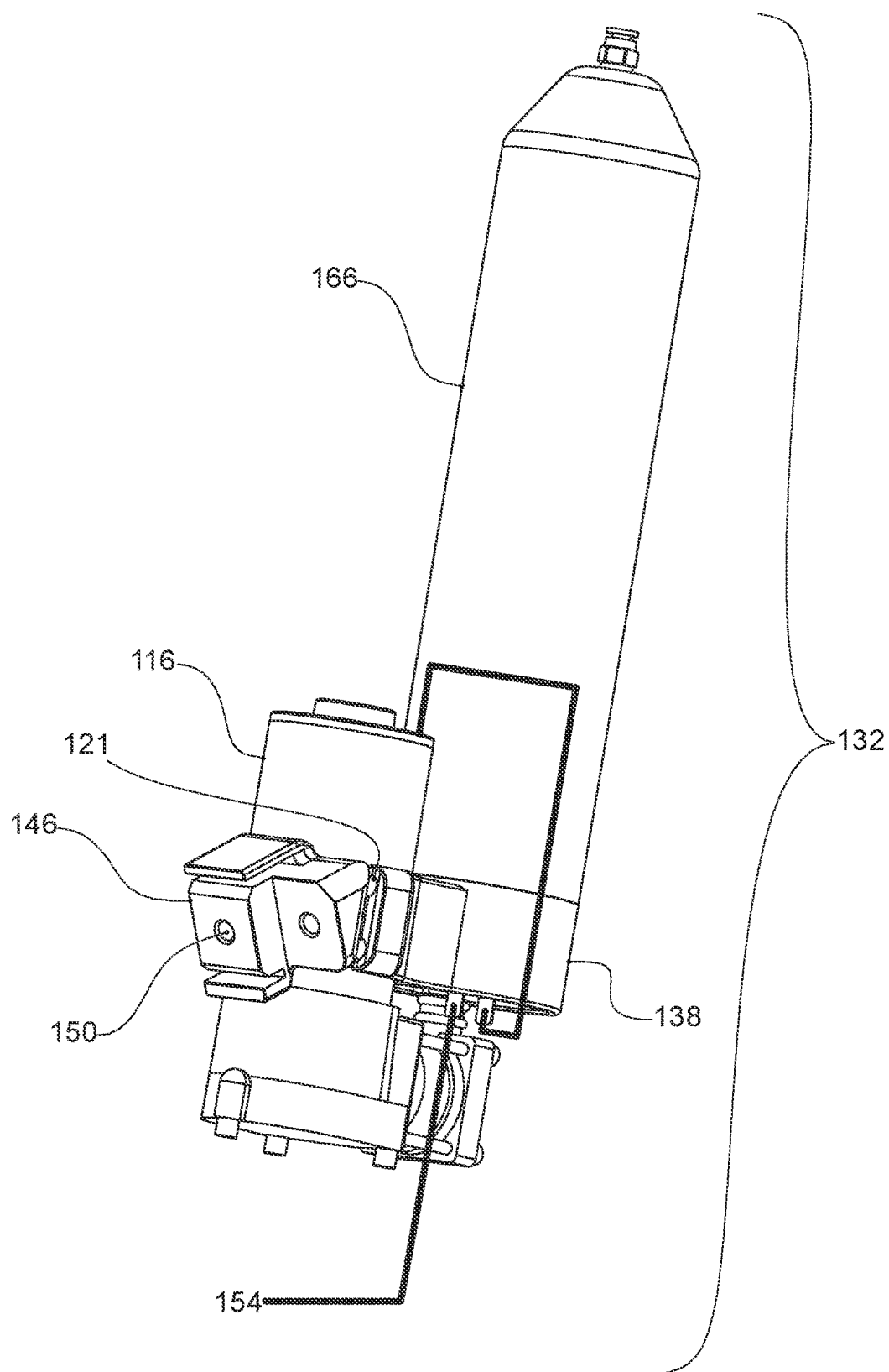
FIG. 10 is an oblique view of integrated air tank and compressor mounting system.

As shown in FIGS. 7-9, the mounting face 146 engages the motorcycle's existing mount 126. The mounting face 146 also has one or more mounting receptacles 150. The mounting receptacle 150 engages a mounting block fastener 140. The mounting block fastener 140 holds the mounting face 146 to the motorcycle's existing mount 126.

As shown in FIG. 8, the mounting face 146 is positioned at an angle relative to the tank mount 170 so that the tank 162 will clear the existing frame rail 130. This angle between the mounting face 146 and the tank mount 170 is called the mounting face angle 148.

Figure 3:
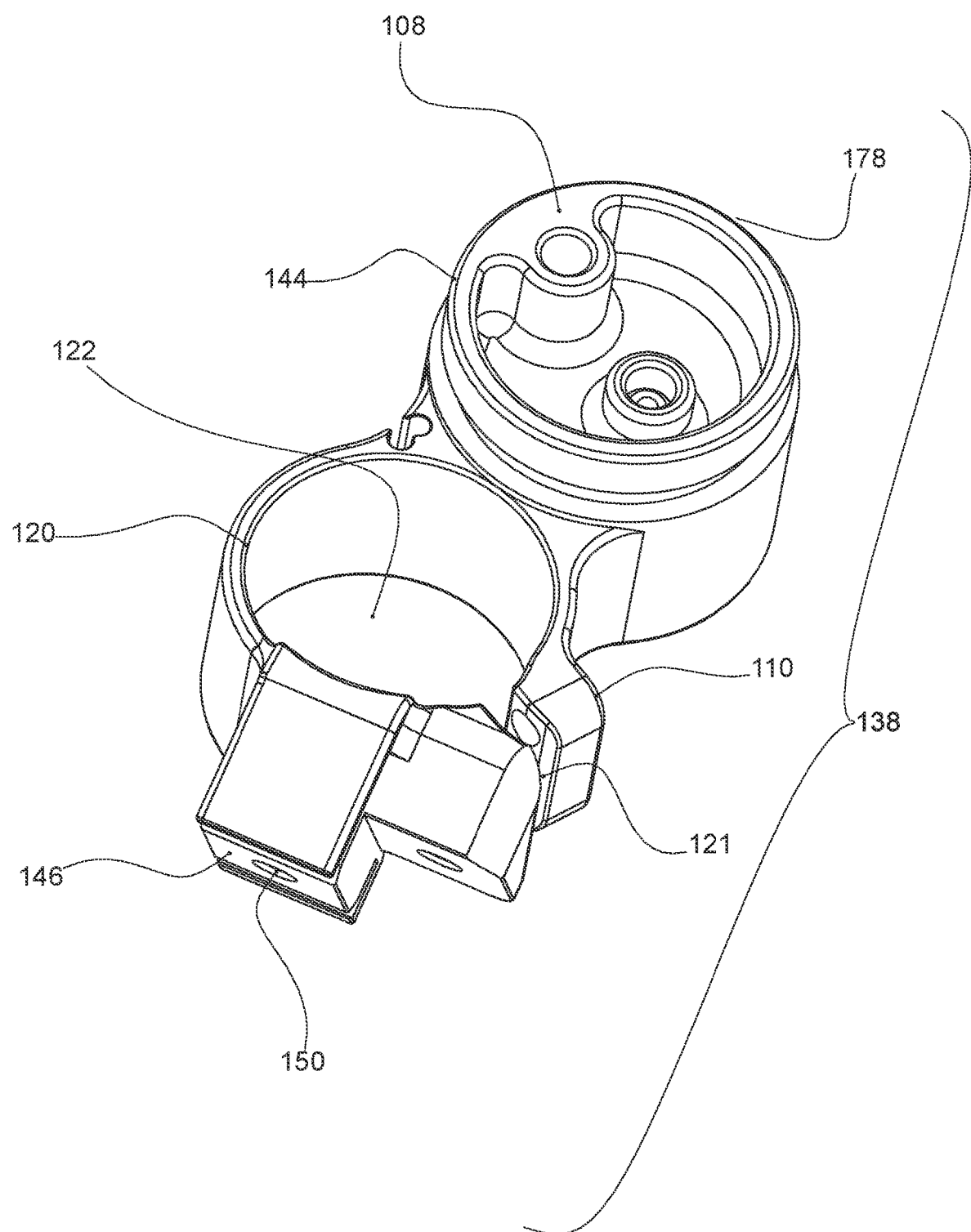
FIG. 3 shows a top perspective view of the mount block.
Figure 4:
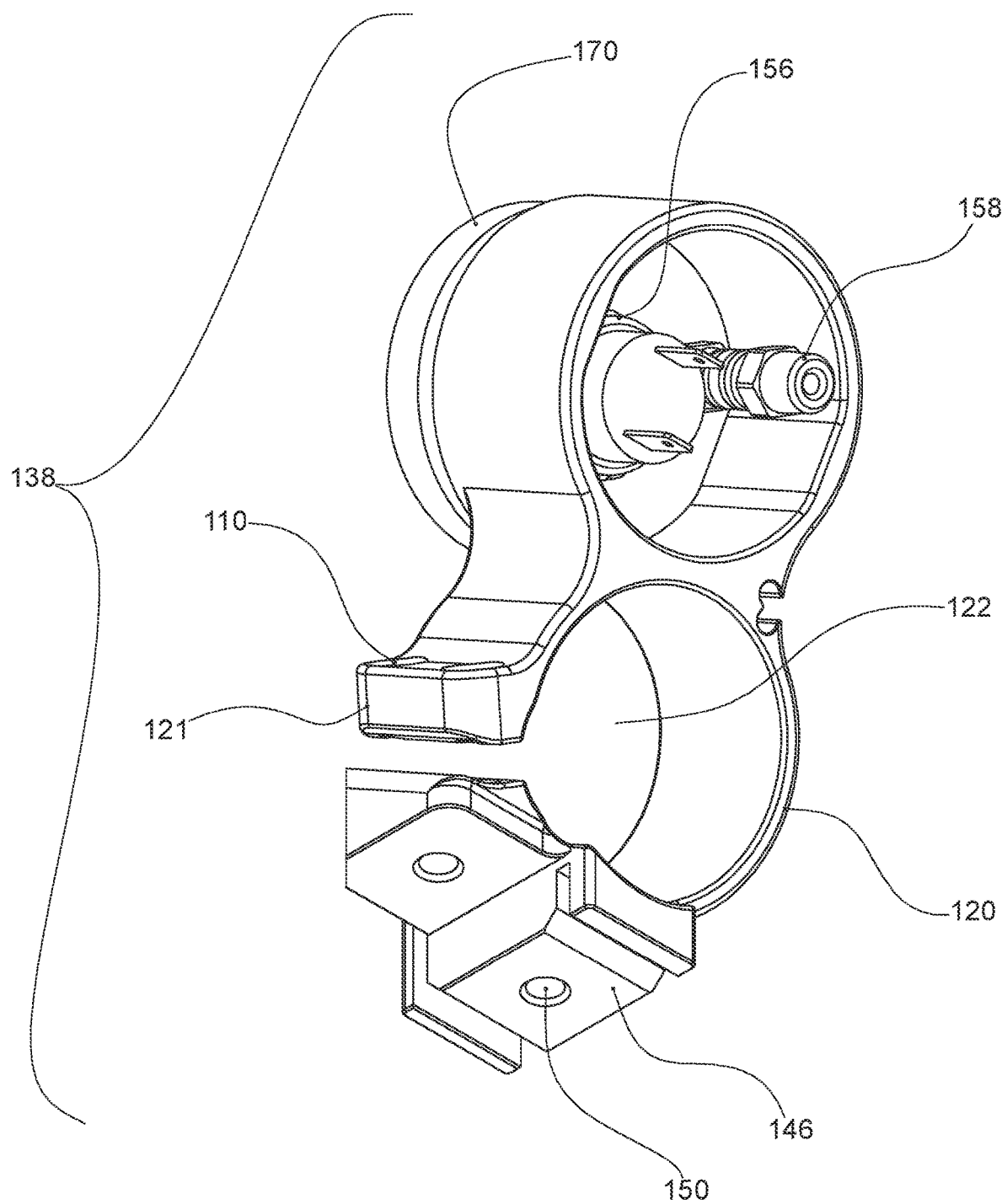
FIG. 4 is an underside perspective view of the mount block.

The compressor 116 is a unit that uses an electric motor to activate a pump to supply high pressure air to fill the tank air volume 164. Typically, the compressor 116 is purchased as a separate unit. As shown in FIGS. 3, 4 and 6, the compressor 116 is affixed to the mount block via the compressor clamp 120. The compressor clamp 120 has a cylindrical opening to fit a cylindrically shaped compressor housing. The compressor 116 is inserted though the circular compressor opening into the compressor clamp 120. The mount block 138 has one or more clamp bolts 110 which act to clamp the compressor 116 in place in the provided cylindrical opening. The clamp bolts 110 clamp the compressor 116 by closing the clamp pinch 121.

Also attached to the mount block 138 is a receptacle for compressor air transfer 158 from the compressor 116 to the tank air volume. This receptacle for compressor air transfer 158 allows the compressor 116 to supply compressed air to the tank air volume 164. Activating the compressor 116 fills the tank air volume 164 with compressed air. Typically, the tank mount wall 171 makes an airtight seal even at high pressure which seals the tank mount 170 for maintaining a pressurized tank air volume 164.

Also attached to the mount block 138 is a pressure switch 156. The pressure switch 156 is connected to the tank air volume 164. The pressure switch 156 is electrically connected to a power supply 154 on one end and the compressor 116 on the other end. A hot wire 192 from the power supply 154 to the pressure switch powers the pressure switch 156. A power wire 190 from the pressure switch 156 to the compressor 116, powers the compressor 116. Other necessary wires complete the circuit.

When the air pressure in the tank air volume 164 drops below a predetermined value the pressure switch 156, closes and allows electrical power to flow from the power supply 154 to the compressor 116. The compressor 116 then activates and causes the tank air volume 164 to be filled with compressed air.

When the air pressure in the tank air volume 164 rises above a predetermined value the pressure switch 156, opens and prevents electrical power from flowing from the power supply 154 to the compressor 116. This shuts off the compressor 116 so the pressure in the tank air volume 164 never rises above a predetermined value. This configuration of controlling compressor operation by the air pressure in the tank air volume 164, means that it is not required to have an electrical switch in the suspension control unit 201. The system automatically keeps the tank air volume 164 at or near the desired pressure due to the pressure switch 156.

When implementing the air connections of the present invention, there are many ways to route the air from the compressor 116 to the tank air volume 164. Typically, a receptacle for compressor air transfer 158 from the compressor 116 to the tank air volume 164 is attached to the mount block 138 opposite the tank mount 170, on the tank mount wall 171.

Preferably, a check valve 108 prevents backflow from the tank air volume 164 to the compressor 116. A check valve 108 can be mounted on the tank mount wall 171. The check valve 108 can be mounted on either side of the tank mount wall 171. Placing it either inside the tank air volume 164, or outside the tank air volume 164. The check valve 108 is connected in line with the flow of air from the compressor to the air tank volume.

A supply line 161 connects the tank air volume 164 to the suspension control unit 201. The supply line 161 is preferably a metal tube formed to be airtight and capable of maintaining variable and operating pressure. The supply line 161 is easily connected via a fitting provided at the center of the air tank on the closed end of the tank.

Figure 11:
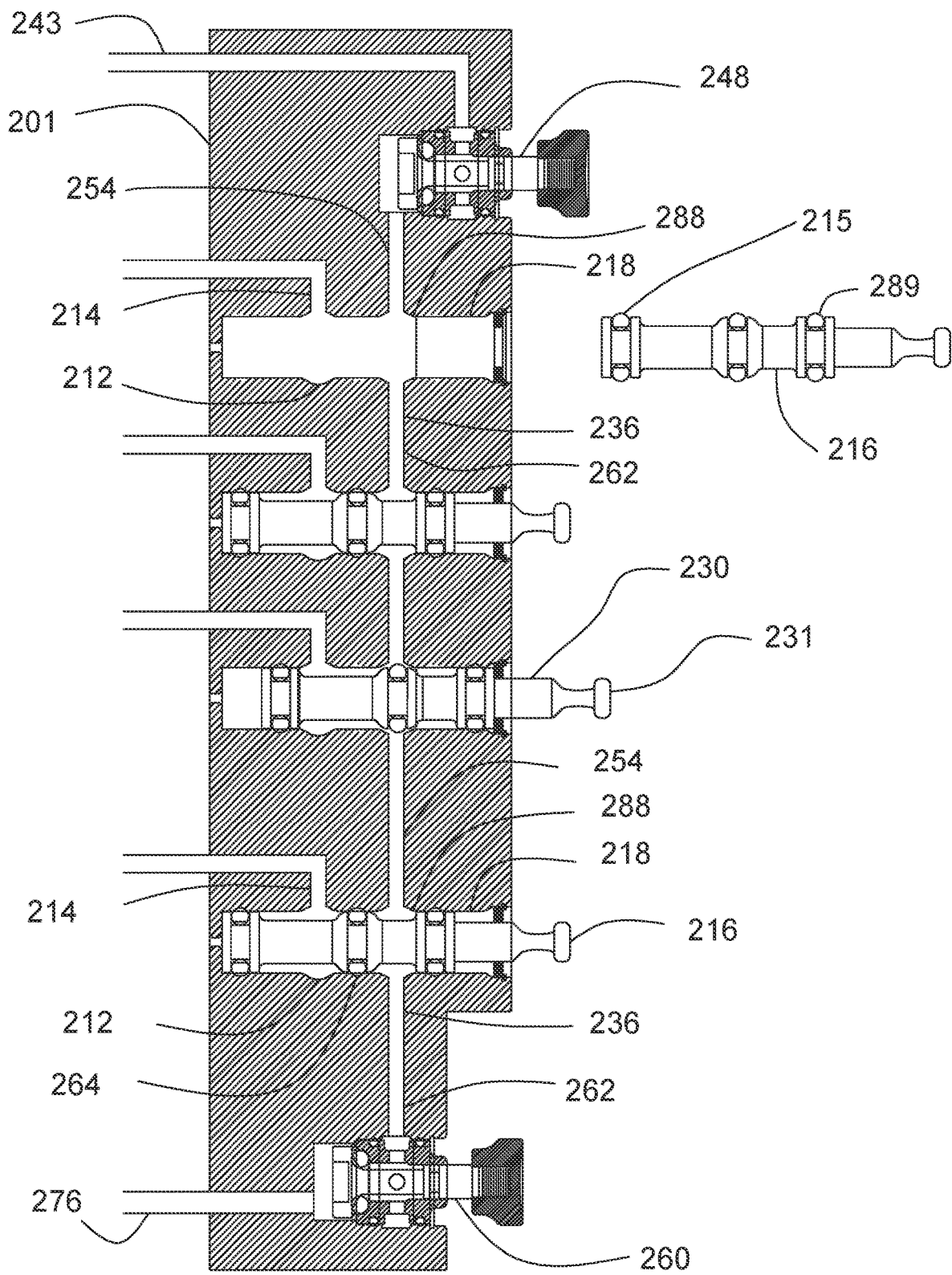
FIG. 11 is a cross section view of suspension control unit.

The air tank cooperates with another key piece of the air suspension system which is a suspension control unit 201 that works to distribute supply pressure 276 to one or more air activated suspension units 440. As shown in FIG. 11, the suspension control unit 201 contains one or more cylindrical control valve passages 218. Each of the one or more control valve passage 218 has a transfer chamber 288. The transfer chamber 288 is preferably but not necessarily of a larger diameter than the control valve passage 218. The transfer chamber 288 has transfer chamber ports which include an entrance port 236 and an exit port 254. Each control valve passage 218 has a component chamber 212 into which there is a component port 214 connected. Each component port 214 is connected to its respective suspension unit 440.

A control valve 216 is slidably inserted into each of the control valve passages 218. The control valves 216 have a cylindrical shaft with one or more sealing surfaces along its axial length, with one of those sealing surfaces being the main seal 264. On either end of the control valves is often a component seal 215 and a transfer seal 289. These additional seals prevent leakage during operation of the device.

The main seal 264 is formed along the axial length of the control valve 216 such that when a control valve 216 is pushed towards the component port 214, the main seal 264 prevents air from passing between the transfer chamber 288 and the component chamber 212. This is the closed position of the control valve 216 because the transfer chamber is closed to the component chamber 212.

The control valve 216 also has an open position and can be moved to the open position from the closed position. When a control valve 216 is pulled away from the component port 214, the main seal 264 moves into the transfer chamber 288. This moves the seal out of the way and allows air to bypass the main seal 264 and pass between the component chamber 212 and the transfer chamber 288. The control valve 216 is in the open position, either because the main seal is moved past the transfer chamber ports or because the transfer chamber 288 is a larger diameter than the control valve passages 218. In the open position, air may flow from the component port 214 to both the entrance port 236 and exit port 254.

The one or more control valve passages 218 are arranged in the suspension control unit 201 so that each entrance port 236 and exit port 254 may be formed as one main passage 262 thru the entire suspension control unit 201.

Figure 12:
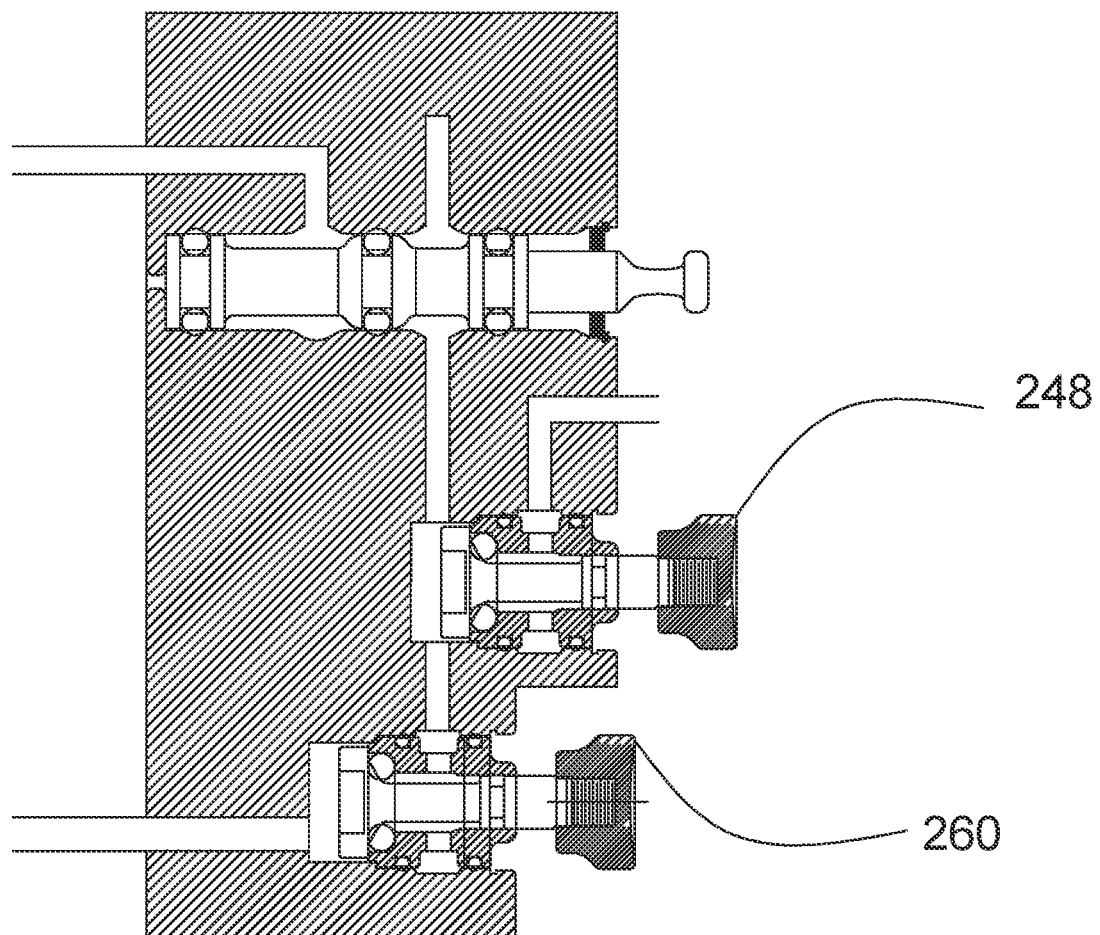
FIG. 12 is a cross section view of suspension control unit showing alternate valve locations.

Preferably, the main passage 262 is connected to an inlet valve 260 on one end and an exhaust valve 248 on the other. Preferably, it is easiest to put the inlet valve 260 and exhaust valve 248 on opposite ends of the main passage 262. However as shown in FIG. 12 it is also possible to put the inlet valve 260 and exhaust valve 248 in any mix along the main passage 262.

Preferably, the control valve 216 has a control valve knob 231 formed on the control rod shaft 230. However, this need not be the case and the control valve 216 may be electrically, magnetically or otherwise mechanically controlled. When the inlet valve 260 is opened, air can flow from the supply pressure 276 to the main passage 262 and to any transfer chamber 288 of each control valve 216. The main passage 262 is connected to an exhaust valve 248 on the other end.

When the exhaust valve 248 is opened, air can flow from any transfer chamber 288 through to the exhaust outlet 243. Thus, any one or a combination of the suspension units 440 may be linked in unison or independently to the supply pressure 276 via the inlet valve 260 or exhaust valve 248 via the opening and closing of control valves 216.

The transfer chambers 288 are connected to the main passage 262 so that when the control valve 216 is open, the suspension units 440 can either receive air from the supply pressure 276 or release air thru the exhaust valve 248 depending on which valves are installed and actuated.

Figure 13:
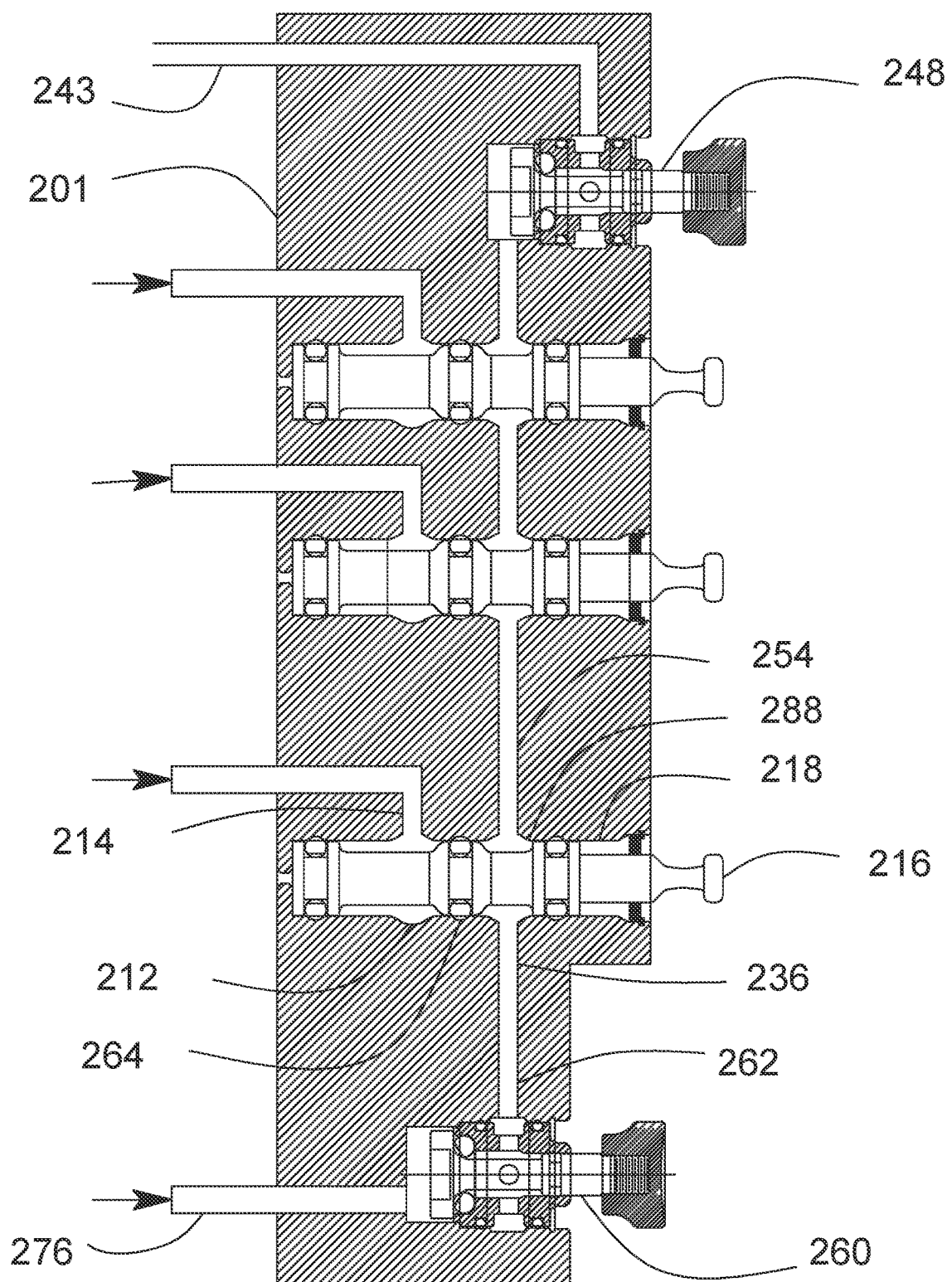
FIG. 13 is a cross section view of suspension control unit showing control valves closed.

The operation of the suspension control system begins with the control valve 216 being pushed towards the component port 214. The main seal 264 prevents air from passing between the transfer chamber 288 and the component chamber 212 as shown in FIG. 13.

Figure 14:
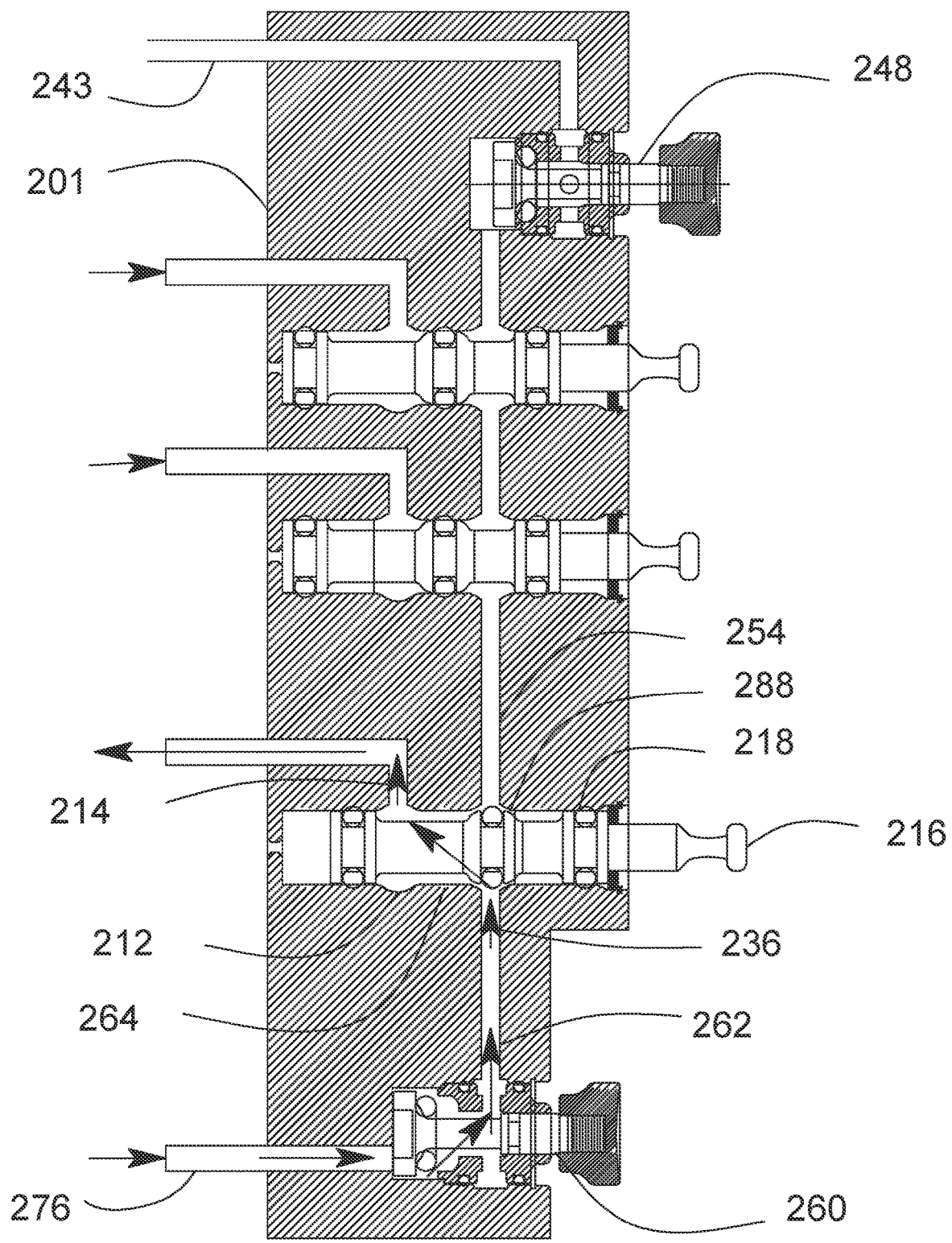
FIG. 14 is a cross section view of suspension control unit showing air flow with the inlet valve open and the control valve open.

When the control valve 216 is pulled away from the component port 214, the main seal 264 moves into the transfer chamber 288, as seen in FIG. 14. This moves the seal out of the way and allows air to bypass the main seal 264 and pass between the component chamber 212 and the transfer chamber 288. In this position, air may flow from the component port 214 to both the entrance port 236 and exit port 254. The entrance port 236 connects with the main passage 262. The inlet valve 260 is also connected to the main passage 262. When the inlet valve 260 is opened, air can flow from the supply pressure 276 to the main passage 262 and to the transfer chamber 288 and from there to the component port 214. Since the component port 214 connects to the suspension unit 440, the inlet valve 260 can pressurize the suspension unit 440.

Figure 15:
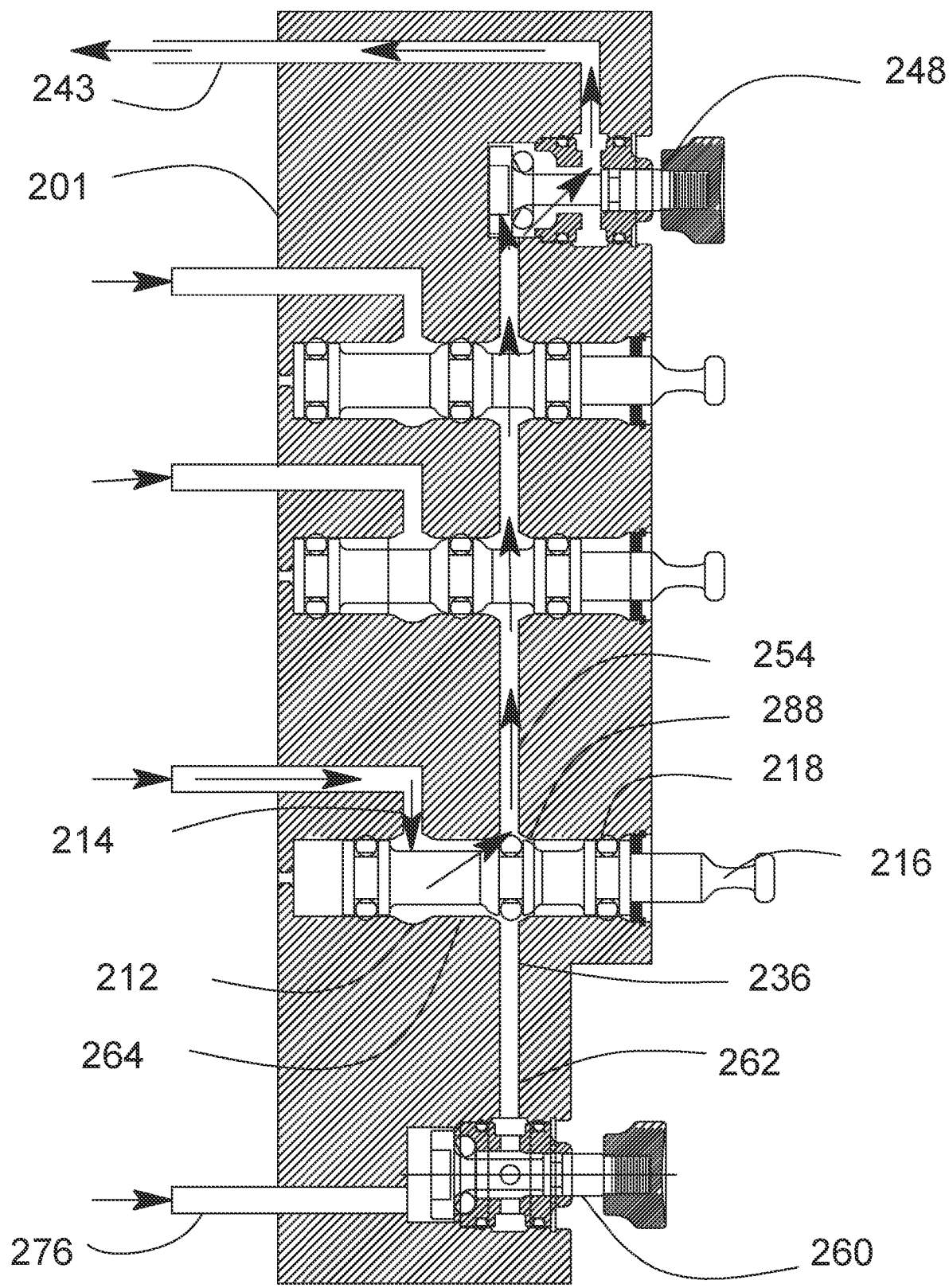
FIG. 15 is a cross section view of suspension control unit showing air flow with the exhaust valve open and the control valve open.

By the same token when the control valve 216 is pulled away from the component port 214, and the system is in the open position, the exhaust valve 248 can be used to reduce pressure in the suspension unit 440 as shown in FIG. 15. Different suspension units may be pressurized, or de-pressurized depending on the control valve selected by the user.

A preferred configuration of the suspension control unit 201 is shown in FIG. 1. While there are many ways to create a suspension control unit 201, a preferred configuration has just two cylindrical control valve passages 218. For clarity these two control valve passages are separately numbered to distinguish front and rear operation. As shown in FIG. 1, the front control valve passage 518 is connected to the front air fork 540. A rear control valve passage 618 is connected to the rear air suspension 640.

Figure 16:
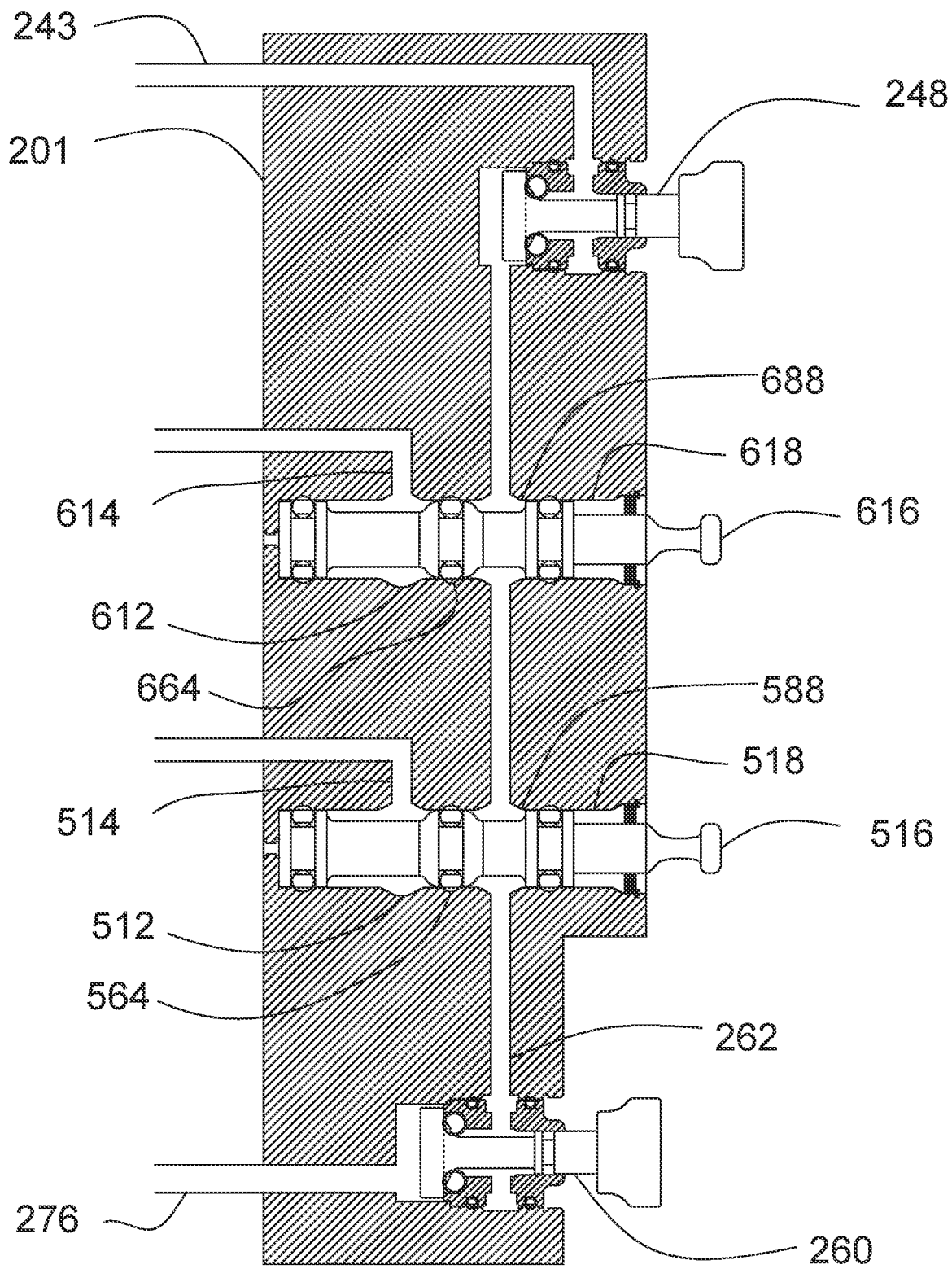
FIG. 16 is a cross section view of suspension control unit showing preferred embodiment for a motorcycle.

As shown in FIG. 16, the front control valve passage 518 is connected to the front air fork 540. A front control valve 516 is slidably inserted into the front control valve passage 518. The front control valve 516 includes of a cylindrical shaft with one or more sealing surfaces along its axial length, one of those sealing surfaces is the front main seal 564. When the front control valve 516 is pushed towards the front component port 514 the front main seal 564 prevents air from passing between the front transfer chamber 588 and the front component chamber 512. When the front control valve 516 is in this position it is in the closed position.

Figure 17:
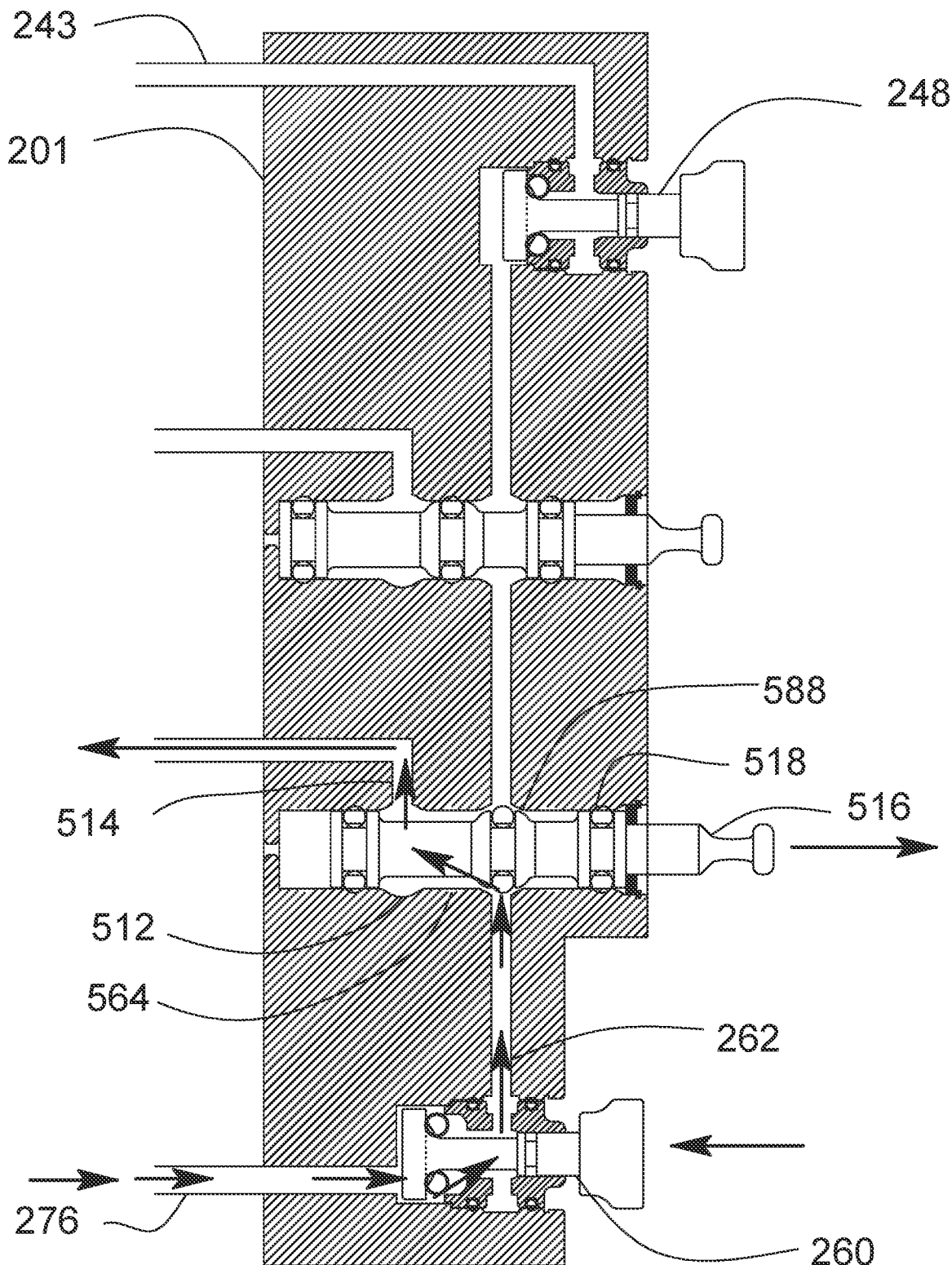
FIG. 17 is a cross section view of suspension control unit showing preferred embodiment for a motorcycle, showing air flow with the inlet valve open and the front control valve open, which lifts the front air forks.

As shown in FIG. 17, the other position that the front control valve 516 can be moved to is the open position. When the front control valve 516 is pulled away from the front component port 514, the front main seal 564 moves into the front transfer chamber 588. This moves the front main seal 564 out of the way and allows air to bypass the front main seal 564 and pass between the front component chamber 512 to the front transfer chamber 588. The front control valve 516 is then in the open position. As shown in FIG. 17, when the inlet valve 260 is opened, air can flow from the supply pressure 276 to the main passage 262 and to any transfer chamber of each control valve. With the front control valve 516 in the open position, supply pressure 276 from the inlet valve 260 will boost pressure in the front air fork 540.

Figure 18:
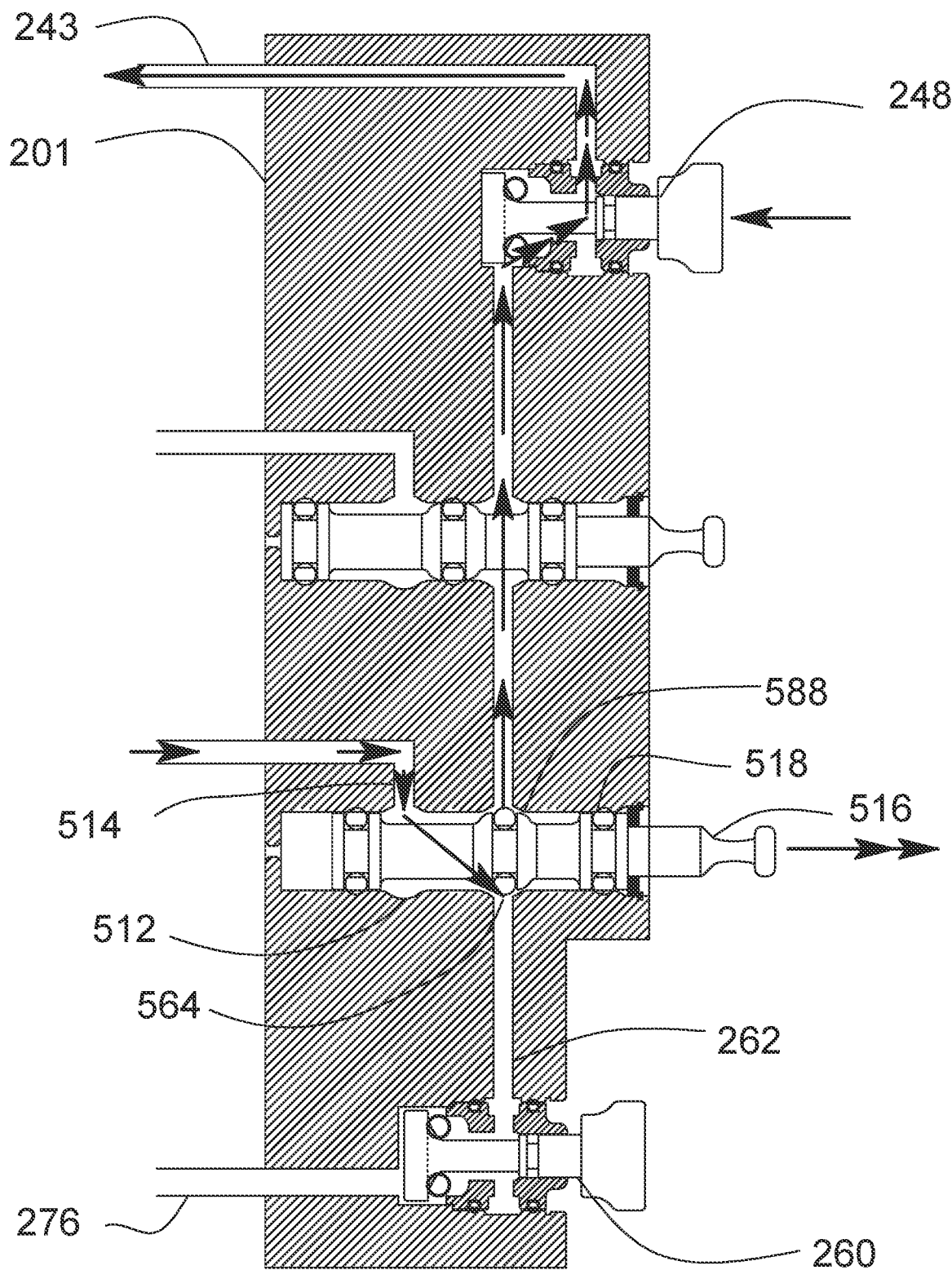
FIG. 18 is a cross section view of suspension control unit showing preferred embodiment for a motorcycle, showing air flow with the exhaust valve open and the front control valve open, which lowers the front air forks.

As shown in FIG. 18, when the front control valve 516 is in the open position and the exhaust valve 248 is opened, air can flow from the front component port 514 to the main passage 262 and then out the exhaust valve 248. With the front control valve 516 in the open position the exhaust valve 248 can reduce pressure in the front air fork 540.

As shown in FIG. 16, the rear control valve passage 618 is connected to the rear air suspension 640. A rear control valve 616 is slidably inserted into the rear control valve passage 618. The rear control valve 616 includes a cylindrical shaft with one or more sealing surfaces along its axial length, one of those sealing surfaces being the rear main seal 664. When the rear control valve 616 is pushed towards the rear component port 614, the rear main seal 664 prevents air from passing between the rear transfer chamber 688 and the rear component chamber 612. When the rear control valve 616 is in this position it is in the closed position.

Figure 19:
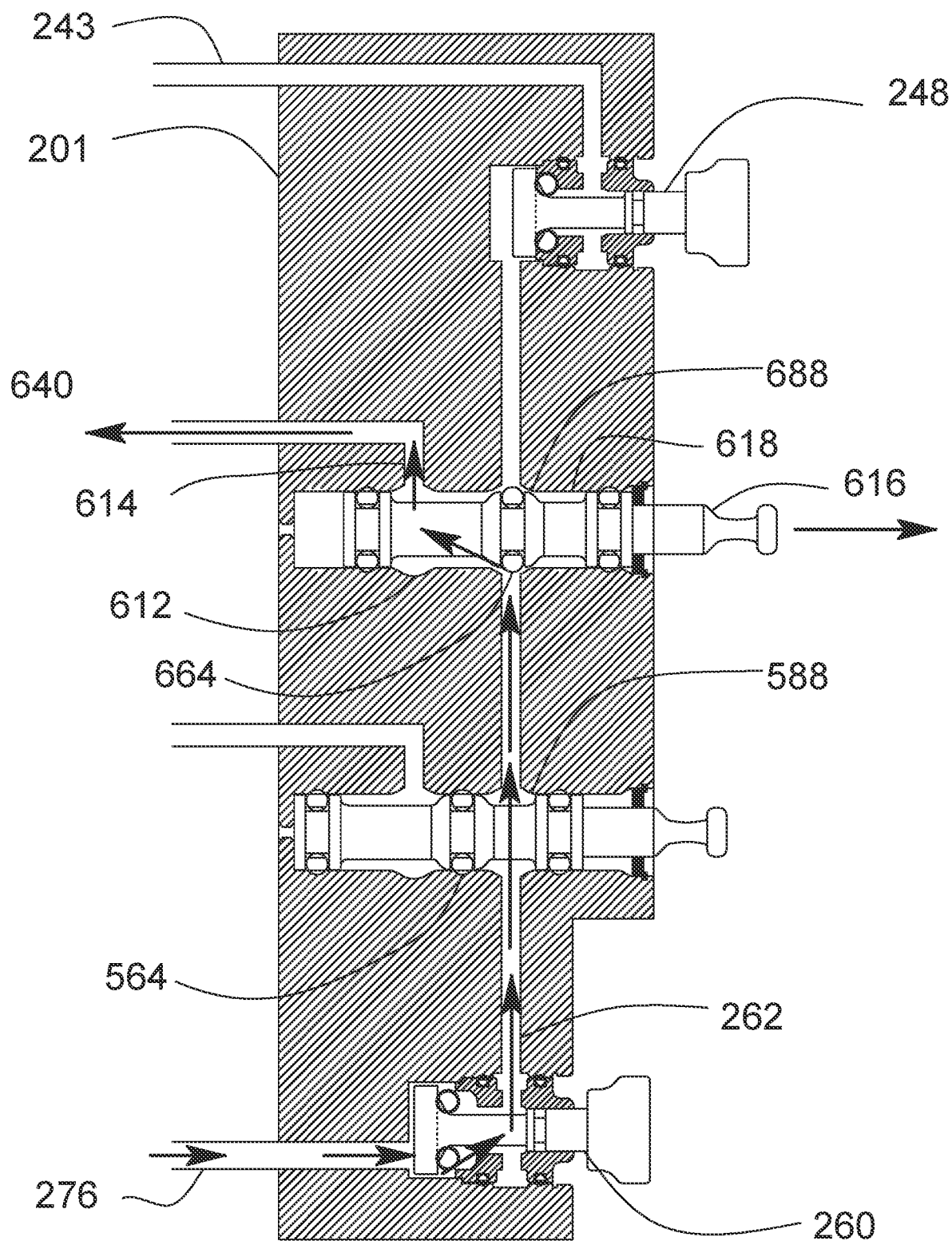
FIG. 19 is a cross section view of suspension control unit showing preferred embodiment for a motorcycle, showing air flow with the inlet valve open and the rear control valve open, which lifts the rear air suspension.

As shown in FIG. 19, the other position that the rear control valve 616 can be moved to is the open position. When the rear control valve 616 is pulled away from the rear component port 614, the rear main seal 664 moves into the rear transfer chamber 688. This moves the rear main seal 664 out of the way and allows air to bypass the rear main seal 664 and pass between the rear component chamber 612 to the rear transfer chamber 688. The rear control valve 616 is then in the open position.

As shown in FIG. 19, when the inlet valve 260 is opened air can flow from the supply pressure 276 to the main passage 262 and to any transfer chamber of each control valve. With the rear control valve 616 in the open position supply pressure 276 from the inlet valve 260 will boost pressure in the rear air suspension 640.

Figure 20:
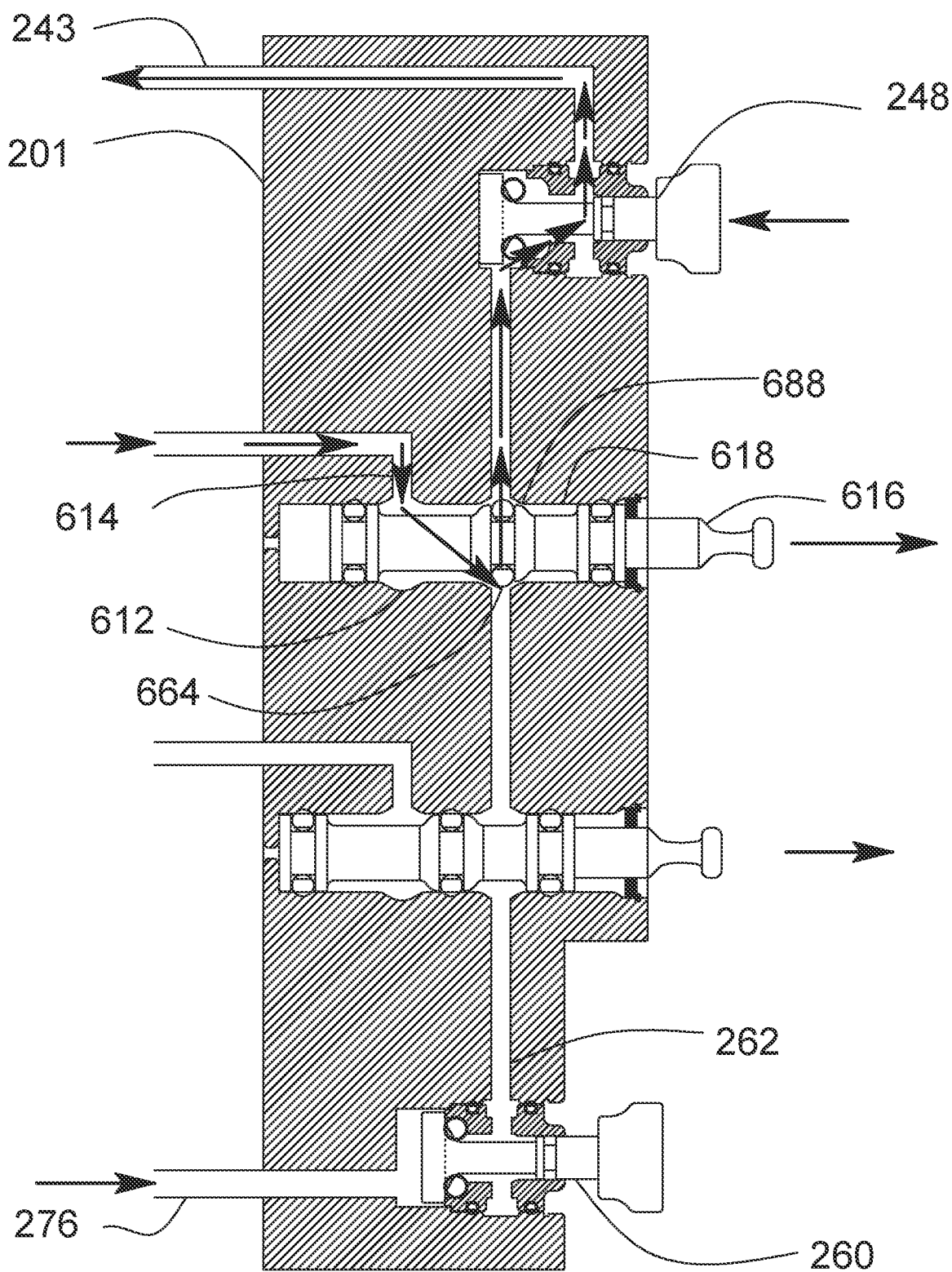
FIG. 20 is a cross section view of suspension control unit showing preferred embodiment for a motorcycle, showing air flow with the exhaust valve open and the rear control valve open, which lowers the rear air suspension.

As shown in FIG. 20, when the rear control valve 616 is in the open position and the exhaust valve 248 is opened air can flow from the rear component port 614 to the main passage 262 and then out the exhaust valve 248. With the rear control valve 616 in the open position the exhaust valve 248 can reduce pressure in the rear air suspension 640.

The invention claimed is:

1. A suspension control system comprising:
   one or more suspension units activated by pressure, wherein the one or more suspension units are configured to receive a supply pressure supplied to the one or more suspension units;
   one or more control valve passages, wherein each control valve passage of the one or more control valve passages has a transfer chamber, wherein the transfer chamber is larger than the control valve passage; and wherein the transfer chamber connects to an entrance port and an exit port;
   one or more component chambers, wherein the one or more component chambers is formed on each of the respective one or more control valve passages; and wherein each component chamber includes a component port; and wherein each component port is connected to its respective suspension unit;

one or more control valves, wherein a control valve of the one or more control valves is inserted into the respective control valve passage of the one or more control valve passages;

one or more shafts, wherein the one or more shafts are installed as part of the one or more control valves;

one or more main seals, wherein each main seal of the one or more main seals is formed on a respective shaft of the one or more shafts, wherein each main seal of the one or more main seals is formed along an axial length of the respective control valve of the one or more control valves such that when the one more control valves is pushed towards the respective one or more component chambers and away from the respective one or more transfer chambers, the respective one or more main seals is in a closed position and inhibits air passage between the respective one or more transfer chambers and the respective one or more component chambers;

and when the one or more control valves is pulled away from the respective component port of the one or more control valves, the respective one or more main seals is in an open position and moves to the respective one or more transfers chambers allowing flow to bypass the respective one or more mains seals and connect the respective one or more component chamber with the respective one or more transfer chambers and both a respective one or more entrance port and exit port;

a main passage, wherein the main passage connects to the respective one or more entrance port and exit port wherein the main passage is connected to both an inlet valve and an exhaust valve; wherein the inlet valve is connected to supply pressure; and wherein the inlet valve is opened and the one or more control valves is open so that flow can pass from the supply pressure to the respective one or more suspension units of any of the open one or more control valves; and wherein the exhaust valve is opened and one or more of the control valves is open, wherein flow can pass from the respective one or more suspension units of any of the open one or more control valves out of the exhaust valve; and any one or combination thereof of the one or more suspension units may be linked in unison or independently to the supply pressure via the inlet valve or exhausted through the exhaust valve via the opening and closing of the one or more control valves.

2. The suspension control system of claim 1, further comprising:

the one or more control valve passages are arranged in the suspension control system so that each entrance port and exit port may be formed as one main passage through the entire suspension control system.

3. The suspension control system of claim 1, further comprising:

the one or more control valves each have a component seal which prevents flow from exiting the respective one or more component chamber opposite the respective one or more main seal.

4. The suspension control system of claim 1, further comprising:

the one or more control valves each have a transfer seal which prevents flow from exiting the respective one or more transfer chamber opposite the respective one or more main seal.

5. The suspension control system of claim 1, further comprising:

an air tank providing the supply pressure to the suspension control system;

a pressure switch is connected to a tank volume; and the pressure switch is electrically connected to a power supply on one end and to a compressor on an other end.

6. The suspension control system of claim 1, further comprising: an integrated tank and compressor mounting system connected to the suspension units comprising:

a mount block, wherein the mount block has a mounting face;

said mounting face engages a vehicle's existing mount;

said mounting face has one or more receptacles to engage a mounting block fastener;

the mounting block fastener holds said mounting face to the vehicle's existing mount;

the mount block also has a compressor clamp for clamping a compressor to the mount block; and the mount block has a tank, said tank is connected to the compressor to allow compressed fluid to flow from the compressor to the tank.

7. The suspension control system of claim 6, wherein the mount block has a threaded cylindrical section which forms a tank mount; and the tank includes a cylindrical tubular section closed at one end and a threaded section at the opposite end such that the tank threads engage the mount block threads to form a threaded joint.

8. The suspension control system of claim 7, wherein the mounting face is positioned at an angle relative to the tank mount so that the tank will clear an existing frame mounting rail.

9. The suspension control system of claim 7, wherein said mounting face engages a vehicle's existing mount at a lower saddlebag support rail and the mounting face is positioned at an angle relative to the tank mount so that the tank will clear an existing frame mounting rail.

10. The suspension control system of claim 7, wherein the compressor clamp comprises a cylindrical opening to fit the compressor.

11. The suspension control system of claim 7, wherein the mounting face is positioned at an angle relative to the tank mount so that the tank will clear an existing frame mounting rail; and a pressure switch is connected to the tank volume; and the pressure switch is electrically connected to a power supply on one end and the compressor on the other end, such that when the tank pressure drops below a set amount the compressor turns on and when the tank pressure goes above a set amount the compressor turns off; and said pressure switch is attached to the mount block on the side opposite the tank mount; and a receptacle for air transfer from the compressor to the tank volume is attached to the mount block opposite the tank mount.

12. The suspension control system of claim 7, wherein the compressor clamp comprises a cylindrical opening to fit the compressor; and the mount block has one or more clamp bolts which act to clamp the compressor in the provided cylindrical opening.

13. The suspension control system of claim 7, wherein a pressure switch is connected to the tank volume; and the pressure switch is electrically connected to a power supply on one end and the compressor on the other end, such that when the tank pressure drops below a set amount the compressor turns on and when the tank pressure goes above a set amount the compressor turns off; and said pressure switch is attached to the mount block on the side opposite the tank mount; and a receptacle for air transfer from the compressor to the tank volume is attached to the mount block opposite the tank mount; and connected to the mount block and in-line with the flow of air from the compressor to the tank air volume is a check valve to prevent backflow from the tank air volume to the compressor.

14. The suspension control system of claim 7, further comprising:

a supply line, wherein the supply line connects to the tank at the center of the closed end of the tank;

wherein the supply line connects the tank air volume to the suspension control system;

the compressor clamp comprises a cylindrical opening to fit the compressor;

the mount block has one or more clamp bolts which act to clamp the compressor in the provided cylindrical opening; and the mounting face is positioned at an angle relative to the tank mount so that the tank will clear an existing frame mounting rail;

a pressure switch is connected to the tank volume; and the pressure switch is electrically connected to a power supply on one end and the compressor on the other end, such that when the tank pressure drops below a set amount the compressor turns on and when the tank pressure goes above a set amount the compressor turns off; and said pressure switch is attached to the mount block on the side opposite the tank mount; and a receptacle for air transfer from the compressor to the tank volume is attached to the mount block opposite the tank mount; and connected to the mount block and in-line with the flow of air from the compressor to the tank air volume is a check valve to prevent backflow from the tank air volume to the compressor.

* * * * *